US012579639B2

(12) United States Patent (10) Patent No.: US 12,579,639 B2
Ezhov et al. (45) Date of Patent: Mar. 17, 2026

(54) SYSTEM AND METHOD FOR FUSION OF VOLUMETRIC AND SURFACE SCAN IMAGES

(71) Applicant: DGNCT LLC, Miami, FL (US)

(72) Inventors: Matvey Ezhov, Yerevan (AM); Alex Sanders, Tel Aviv (IL); Mamat Shamshiev, Yerevan (AM); Maria Golitsyna, Yerevan (AM)

( * ) Notice: Subject to any disclaimer, the term of this patent is extended or adjusted under 35 U.S.C. 154(b) by 510 days.

(21) Appl. No.: 17/961,094

(22) Filed: Oct. 6, 2022

(65) Prior Publication Data

US 2023/0051400 A1 Feb. 16, 2023

Related U.S. Application Data

(63) Continuation-in-part of application No. 17/941,477, filed on Sep. 9, 2022, which is a continuation-in-part of application No. 17/854,894, filed on Jun. 30, 2022, which is a continuation-in-part of application No. 17/564,565, filed on Dec. 29, 2021, now Pat. No. 12,229,964, which is a continuation-in-part of application No. 17/215,315, filed on Mar. 29, 2021, now Pat. No. 12,062,170, which is a continuation-in-part of application No. 16/783,615,
(Continued)

(51) Int. Cl.
 *G06T 7/00* (2017.01)
(52) U.S. Cl.
 CPC .. *G06T 7/0012* (2013.01); *G06T 2207/10072* (2013.01); *G06T 2207/30036* (2013.01)

(58) Field of Classification Search
 CPC ... A61C 7/002; A61C 9/0053; A61C 13/0004; G06T 5/50; G06T 5/80; G06T 7/11; G06T 7/33; G06T 2207/10081; G06T 2207/20021; G06T 2207/20084; G06T 2207/30036; A61B 5/0013; A61B 5/4547; A61B 5/7267; A61B 2576/00; A61B 5/7264; G16H 30/40; G16H 50/20; G16H 50/50
 See application file for complete search history.

(56) References Cited

U.S. PATENT DOCUMENTS

2012/0288177 A1* 11/2012 Wang .................... G06T 11/008
382/294
2014/0329194 A1* 11/2014 Sachdeva ............... A61C 7/002
433/24
(Continued)

*Primary Examiner* — Van D Huynh
(74) *Attorney, Agent, or Firm* — Mohamed C. Azeez

(57) ABSTRACT

A system and method for generating a fusion of volumetric images and surface scan images said system comprising: a processor configuring the system to: receive both a volumetric image tooth mesh and surface scan image tooth crown mesh from a same patient, registered to a similar coordinate system; segment by anatomical structure each of the registered meshes that are in common between each of the registered volumetric image tooth mesh and the surface scan tooth crown mesh; and recognize a fusion vertices for each of the segmented volumetric image tooth mesh and segmented surface scan tooth crown mesh for matching the recognized meshes; remove a surface fragment from the matched volumetric image mesh in common with the matched surface scan image mesh for removal from the volumetric image mesh; and fuse the meshes by triangulating the recognized fusion vertices.

12 Claims, 26 Drawing Sheets fusing meshes by triangulating the fusion vertices: finding edges (pairs of vertices) adjacent to a single triangle on both volumetric and surface scan meshes and combining fusion vertices from both meshes into a single point cloud; then triangulate it by generating an alpha shape resulting in a fusion of the two meshes by smoothly joining the fusion vertices.

1710

Related U.S. Application Data filed on Feb. 6, 2020, now Pat. No. 11,443,423, which is a continuation-in-part of application No. 16/175, 067, filed on Oct. 30, 2018, now Pat. No. 10,991,091.

(56) References Cited

U.S. PATENT DOCUMENTS

| | | | |
|---|---|---|---|
| 2016/0310090 A1* | 10/2016 | Klinder | A61B 5/055 |
| 2017/0249725 A1* | 8/2017 | Carlson | A61B 6/51 |
| 2019/0197682 A1* | 6/2019 | Hazan | G06T 7/155 |
| 2020/0051257 A1* | 2/2020 | Sauer | G06T 7/344 |
| 2020/0146646 A1* | 5/2020 | Tuzoff | A61B 6/463 |
| 2020/0306010 A1* | 10/2020 | Aamodt | G16H 30/20 |
| 2020/0320685 A1* | 10/2020 | Anssari Moin | G06N 3/08 |
| 2022/0079445 A1* | 3/2022 | Sato | A61B 5/0066 |
| 2023/0121899 A1* | 4/2023 | Naumovets | A61C 7/002 |
| | | | 433/24 |

\* cited by examiner

1102

COARSE MODEL:
combining coarse model output with coarse input image at fine resolution

1104

FINE MODEL:
passing combination through fine model to generate a probabilistic

1106

MESH MODULE

Build A Dental
Crown Mesh

1304b

Extract A
Teeth Mesh

Align Meshes

receiving a volumetric image and surface scan    1402
image.

segmenting the volumetric image and surface scan    1404
image into a set of distinct anatomical structures.

1406 extracting a polygonal mesh from the volumetric
image featuring common structures with the
polygonal mesh from the surface scan image.

1408 converting both meshes from the volumetric image and from
the surface scan to a point cloud; and aligning the converted
meshes via point clouds using a point set registration.

FIG. 14 receiving a volumetric image and    1502
surface scan image for segmentation
into a distinct anatomical structure.

applying a binary erosion on the voxels corresponding to a  1504
structure (eroded mask); and subtracting the eroded mask from
a non-eroded mask revealing voxels on the boundary for selection.

selecting a subset of boundary voxels as a point set by    1506
selecting a random subset of points to keep a number of points
similar to a number of points on a corresponding structure in a
polygonal mesh.

1508
aligning a point set from the selected subset of
boundary voxels from the received/segmented volumetric
image and surface scan image using a point set registration.

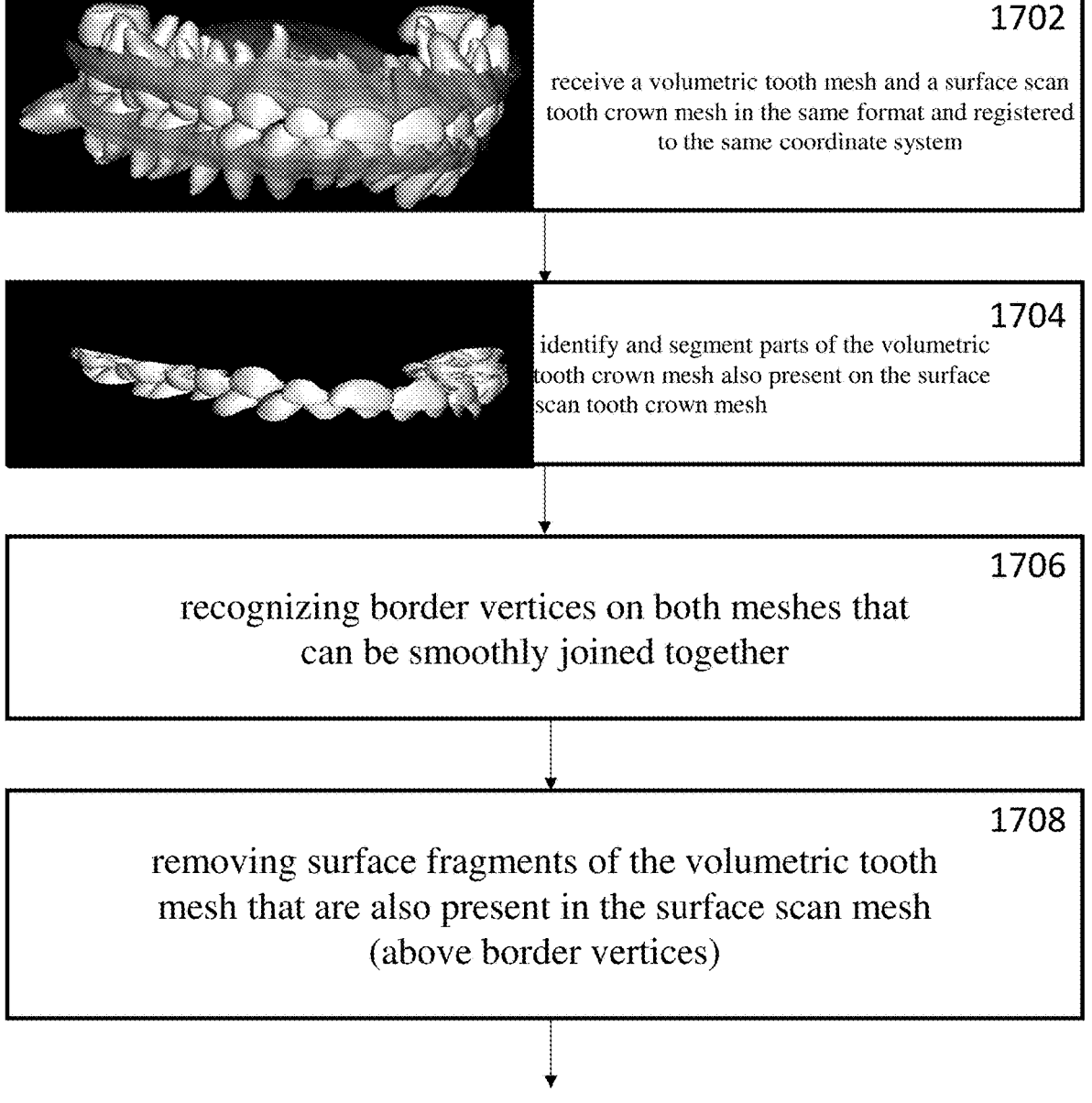

1702 receive a volumetric tooth mesh and a surface scan tooth crown mesh in the same format and registered to the same coordinate system

1704 identify and segment parts of the volumetric tooth crown mesh also present on the surface scan tooth crown mesh

1706 recognizing border vertices on both meshes that can be smoothly joined together

1708 removing surface fragments of the volumetric tooth mesh that are also present in the surface scan mesh (above border vertices)

FIG. 17

continued from previous sheet fusing meshes by triangulating the fusion vertices: finding edges
(pairs of vertices) adjacent to a single triangle on both
volumetric and surface scan meshes and combining fusion
vertices from both meshes into a single point cloud; then
triangulate it by generating an alpha shape resulting in a fusion
of the two meshes by smoothly joining the fusion vertices.

1710

SYSTEM AND METHOD FOR FUSION OF VOLUMETRIC AND SURFACE SCAN IMAGES

BACKGROUND

Field

This invention relates generally to medical diagnostics, and more specifically to an automated system and method for the fusion of volumetric and surface scan images for improving medical/dental diagnostics.

Related Art

Modern image generation systems play an important role in disease detection and treatment planning. Few existing systems and methods were discussed as follows. One common method utilized is dental radiography, which provides dental radiographic images that enable the dental professional to identify many conditions that may otherwise go undetected and to see conditions that cannot be identified clinically. Another technology is cone beam computed tomography (CBCT) that allows to the view of structures in the oral-maxillofacial complex in three dimensions. Hence, cone beam computed tomography technology is most desired over dental radiography.

However, CBCT includes one or more limitations, such as time consumption and complexity for personnel to become fully acquainted with the imaging software and correctly using digital imaging and communications in medicine (DICOM) data. American Dental Association (ADA) also suggests that the CBCT image should be evaluated by a dentist with appropriate training and education in CBCT interpretation. Further, many dental professionals who incorporate this technology into their practices have not had the training required to interpret data on anatomic areas beyond the maxilla and the mandible. To address the foregoing issues, deep learning has been applied to various medical imaging problems to interpret the generated images, but its use remains limited within the field of dental radiography. Further, most applications only work with 2D X-ray images.

Another existing article entitled "Teeth and jaw 3D reconstruction in stomatology", Proceedings of the International Conference on Medical Information Visualisation—Bio-Medical Visualisation, pp 23-28, 2007, researchers Krsek et al. describe a method dealing with problems of 3D tissue reconstruction in stomatology. In this process, 3D geometry models of teeth and jaw bones were created based on input (computed tomography) CT image data. The input discrete CT data were segmented by a nearly automatic procedure, with manual correction and verification. Creation of segmented tissue 3D geometry models was based on vectorization of input discrete data extended by smoothing and decimation. The actual segmentation operation was primarily based on selecting a threshold of Hounsfield Unit values. However, this method fails to be sufficiently robust for practical use.

Another existing U.S. Pat. No. 8,849,016, entitled "Panoramic image generation from CBCT dental images" to Shoupu Chen et al. discloses a method for forming a panoramic image from a computed tomography image volume, acquires image data elements for one or more computed tomographic volume images of a subject, identifies a subset of the acquired computed tomographic images that contain one or more features of interest and defines, from the subset of the acquired computed tomographic images, a sub-volume having a curved shape that includes one or more of the contained features of interest. The curved shape is unfolded by defining a set of unfold lines wherein each unfold line extends at least between two curved surfaces of the curved shape sub-volume and re-aligning the image data elements within the curved shape sub-volume according to a re-alignment of the unfold lines. One or more views of the unfolded sub-volume are displayed.

Another existing patent application number US20080232539, entitled "Method for the reconstruction of a panoramic image of an object, and a computed tomography scanner implementing said method" to Alessandro Pasini et al. discloses a method for the reconstruction of a panoramic image of the dental arches of a patient, a computer program product, and a computed tomography scanner implementing said method. The method involves acquiring volumetric tomographic data of the object; extracting, from the volumetric tomographic data, tomographic data corresponding to at least three sections of the object identified by respective mutually parallel planes; determining, on each section extracted, a respective trajectory that a profile of the object follows in an area corresponding to said section; determining a first surface transverse to said planes such as to comprise the trajectories, and generating the panoramic image on the basis of a part of the volumetric tomographic data identified as a function of said surface. However, the above references also fail to address the afore discussed problems regarding the cone beam computed tomography technology and image generation system.

Therefore, there is a need for an automated parsing pipeline system and method for anatomical localization and condition classification. There is a need for training an AI/ML model for performing segmentation of any dental volumetric image for providing dental practitioners with an automated diagnostic tool. Additionally, while individual imaging techniques, such as CBCT, are powerful on their own, when combined, they can provide a more accurate 3D representation of a patient. In practice, volumetric CBCT images are already being merged with surface Intraoral Scans (IOS) to improve planning for computer-guided surgery. However, this superimposition must currently be done manually. One method, for example, involves manually identifying and specifying matching points in both the volumetric images and surface scants. The process of manual alignment is time-consuming. An automated system capable of aligning/fusing volumetric images and surface scans would benefit dental practitioners by reducing the time and effort required to align said images prior to use in surgical and clinical applications.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Embodiments disclosed include an automated parsing pipeline system and method for anatomical localization and condition classification.

In an embodiment, the system comprises an input event source, a memory unit in communication with the input event source, a processor in communication with the memory unit, a volumetric image processor in communication with the processor, a voxel parsing engine in communication with the volumetric image processor and a localizing layer in communication with the voxel parsing engine. In one embodiment, the memory unit is a non-transitory storage element storing encoded information. In one embodiment, at least one volumetric image data is received from the input event source by the volumetric image processor. In one embodiment, the input event source is a radio-image gathering source.

The processor is configured to parse the at least one received volumetric image data into at least a single image frame field of view by the volumetric image processor. The processor is further configured to localize anatomical structures residing in the at least single field of view by assigning each voxel a distinct anatomical structure by the voxel parsing engine. In one embodiment, the single image frame field of view is pre-processed for localization, which involves rescaling using linear interpolation. The pre-processing involves use of any one of a normalization schemes to account for variations in image value intensity depending on at least one of an input or output of volumetric image. In one embodiment, localization is achieved using a V-Net-based fully convolutional neural network.

The processor is further configured to select all voxels belonging to the localized anatomical structure by finding a minimal bounding rectangle around the voxels and the surrounding region for cropping as a defined anatomical structure by the localization layer. The bounding rectangle extends by at least 15 mm vertically and 8 mm horizontally (equally in all directions) to capture the tooth and surrounding context. In one embodiment, the automated parsing pipeline system further comprises a detection module. The processor is configured to detect or classify the conditions for each defined anatomical structure within the cropped image by a detection module or classification layer. In one embodiment, the classification is achieved using a DenseNet 3-D convolutional neural network.

In another embodiment, an automated parsing pipeline method for anatomical localization and condition classification is disclosed. At one step, at least one volumetric image data is received from an input event source by a volumetric image processor. At another step, the received volumetric image data is parsed into at least a single image frame field of view by the volumetric image processor. At another step, the single image frame field of view is pre-processed by controlling image intensity value by the volumetric image processor. At another step, the anatomical structure residing in the single pre-processed field of view is localized by assigning each voxel a distinct anatomical structure ID by the voxel parsing engine. At another step, all voxels belonging to the localized anatomical structure is assigned a distinct identifier and segmentation is based on a distribution approach. Optionally, a segmented polygonal mesh may be generated from the distribution-based segmentation. Further optionally, the polygonal mesh may be generated from a coarse-to-fine model segmentation of coarse input volumetric images. In other embodiments, may be converted selected by finding a minimal bounding rectangle around the voxels and the surrounding region for cropping as a defined anatomical structure by the localization layer. In another embodiment, the method includes a step of, classifying the conditions for each defined anatomical structure within the cropped image by the classification layer.

In another embodiment, the system comprises an input event source, a memory unit in communication with the input event source, a processor in communication with the memory unit, an image processor in communication with the processor, a segmentation layer in communication with the image processor, a mesh layer in communication with the segmentation layer, and an alignment module in communication with both the segmentation layer and mesh layer. In one embodiment, the memory unit is a non-transitory storage element storing encoded information. In one embodiment, at least one volumetric image datum and at least one surface scan datum are received from the input event source by the image processor. In one embodiment, the input event source is at least one radio-image gathering source. In one embodiment, the volumetric image is a three-dimensional voxel array of a maxillofacial anatomy of a patient and the surface scan is a polygonal mesh corresponding to the maxillofacial anatomy of the same patient.

The processor is configured to segment both volumetric images and surface scan images into a set of distinct anatomical structures. In one embodiment, the volumetric image is segmented by assigning an anatomical structure identifier to each volumetric image voxel, and the surface scan image segmented by assigning an anatomical structure identifier to each vertex or face of the surface scan's mesh. The volumetric image and the surface scan image have at least one distinct anatomical structure in common.

The processor is further configured to convert both the volumetric image and the surface scan image into point clouds/point sets that can be aligned. In one embodiment, a polygonal mesh is extracted from the volumetric image. Both the original surface scan polygonal mesh and the extracted volumetric image mesh are converted to point clouds. In one embodiment, both the volumetric image and surface scan image are processed by applying a binary erosion on the voxels corresponding to an anatomical structure, producing an eroded mask. The eroded mask is subtracted from a non-eroded mask, revealing voxels on the boundary. A random subset of boundary voxels is selected as a point set by selecting a number of points similar to a number of points on a corresponding structure in a polygonal mesh. Once both the volumetric image and surface scan image are converted to point clouds/point sets, the volumetric image and surface scan image point cloud/point sets are aligned. In one embodiment, alignment is accomplished using point set registration. Alternatively, each of the volumetric and surface scan meshes may be converted into a format featuring coordinates of assigned structures, landmarks, etc. for alignment and/or fusion based on common coordinates/structures, landmarks, etc.

Other embodiments of this aspect include corresponding computer systems, apparatus, and computer programs recorded on one or more computer storage devices, each configured to perform the actions of the methods.

BRIEF DESCRIPTION OF THE DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which:

FIG. 17 illustrates in a method flow diagram, the automated fusion pipeline according to an aspect of the invention.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The present embodiments disclose for a system and method for an automated and AI-aided alignment of volumetric images and surface scan images for improved dental diagnostics. In addition to the various segmentation/localization techniques for assigning structures to each of the received volumetric and surface scan images—as described previously—the automated alignment pipeline additionally features an alignment layer for aligning the converted meshes/erosion points from each of the image types.

Specific embodiments of the invention will now be described in detail with reference to the accompanying FIGS. 1A-7. In the following detailed description of embodiments of the invention, numerous specific details are set forth in order to provide a more thorough understanding of the invention. In other instances, well-known features have not been described in detail to avoid obscuring the invention. Embodiments disclosed include an automated parsing pipeline system and method for anatomical localization and condition classification.

Figure 1A:
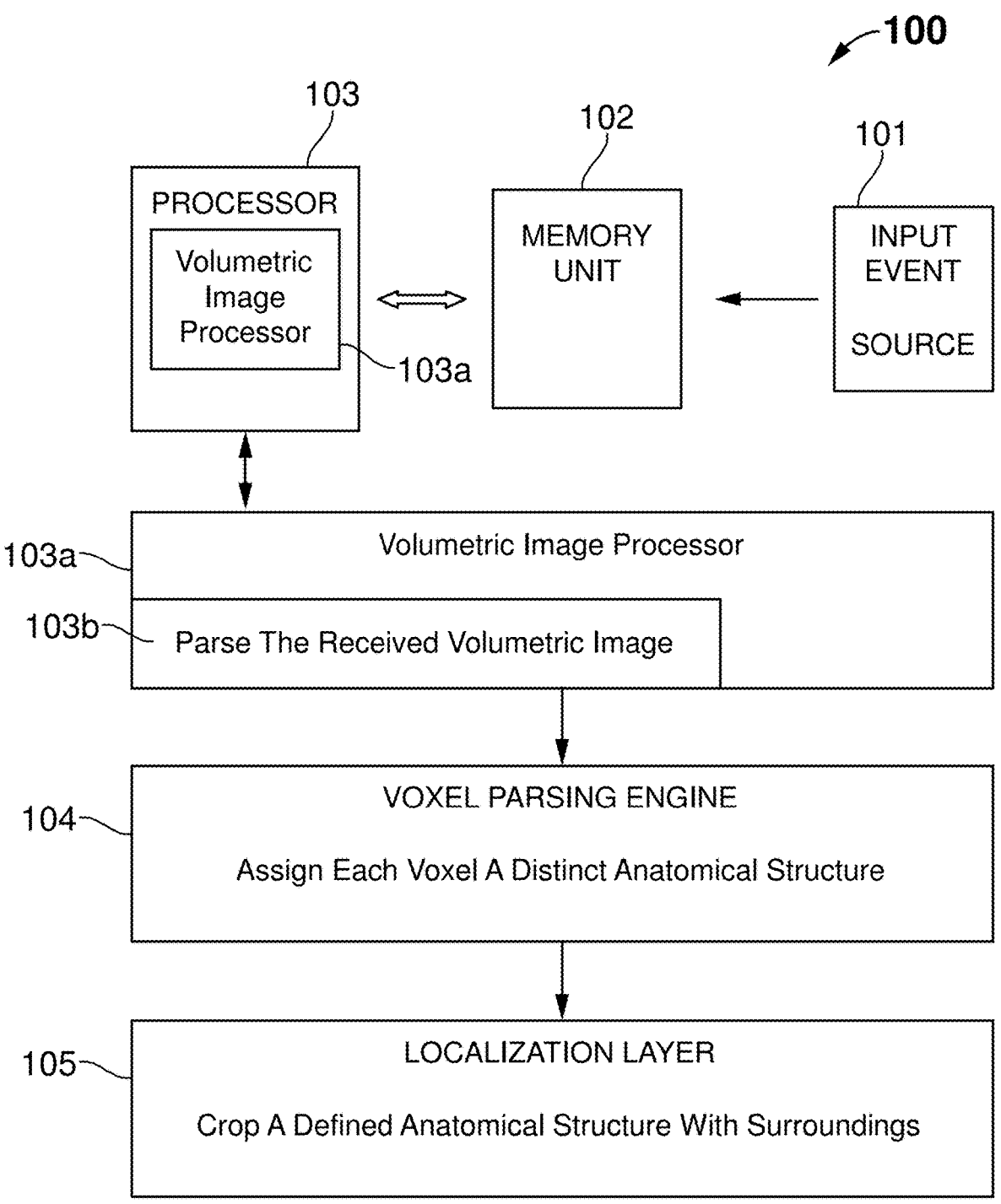
FIG. 1A illustrates in a block diagram, an automated parsing pipeline system for anatomical localization and condition classification, according to an embodiment.

FIG. 1A illustrates a block diagram 100 of the system comprising an input event source 101, a memory unit 102 in communication with the input event source 101, a processor 103 in communication with the memory unit 102, a volumetric image processor 103a in communication with the processor 103, a voxel parsing engine 104 in communication with the volumetric image processor 103a and a localizing layer 105 in communication with the voxel parsing engine 104. In an embodiment, the memory unit 102 is a non-transitory storage element storing encoded information. The encoded instructions when implemented by the processor 103, configure the automated pipeline system to localize an anatomical structure and classify the condition of the localized anatomical structure.

In one embodiment, an input data is provided via the input event source 101. In one embodiment, the input data is a volumetric image data and the input event source 101 is a radio-image gathering source. In one embodiment, the input data is 2D image data. The volumetric image data comprises 3-D pixel array. The volumetric image processor 103a is configured to receive the volumetric image data from the radio-image gathering source. Initially, the volumetric image data is pre-processed, which involves conversion of 3-D pixel array into an array of Hounsfield Unit (HU) radio intensity measurements.

The processor 103 is further configured to parse at least one received volumetric image data 103b into at least a single image frame field of view by the volumetric image processor.

The processor 103 is further configured to localize anatomical structures residing in the single image frame field of view by assigning each voxel a distinct anatomical structure by the voxel parsing engine 104. In one embodiment, the single image frame field of view is pre-processed for localization, which involves rescaling using linear interpolation. The pre-processing involves use of any one of a normalization schemes to account for variations in image value intensity depending on at least one of an input or output of volumetric image. In one embodiment, localization is achieved using a V-Net-based fully convolutional neural network. In one embodiment, the V-Net is a 3D generalization of UNet.

The processor 103 is further configured to select all voxels belonging to the localized anatomical structure by finding a minimal bounding rectangle around the voxels and the surrounding region for cropping as a defined anatomical structure by the localization layer. The bounding rectangle extends by at least 15 mm vertically and 8 mm horizontally (equally in all directions) to capture the tooth and surrounding context.

Figure 1B:
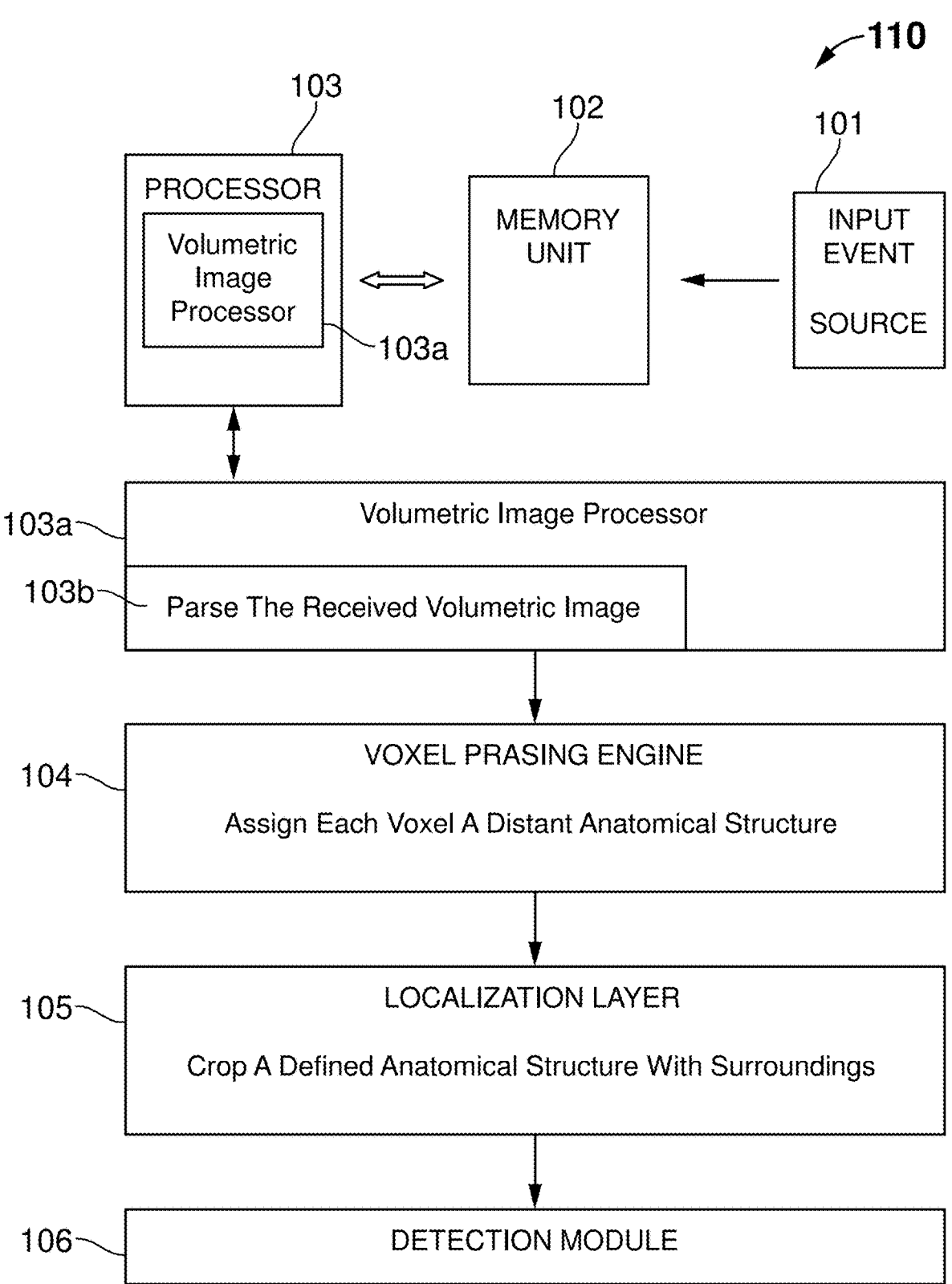
FIG. 1B illustrates in a block diagram, an automated parsing pipeline system for anatomical localization and condition classification, according to another embodiment.

FIG. 1B illustrates in a block diagram 110, an automated parsing pipeline system for anatomical localization and condition classification, according to another embodiment. The automated parsing pipeline system further comprises a detection module 106. The processor 103 is configured to detect or classify the conditions for each defined anatomical structure within the cropped image by a detection module or classification layer 106. In one embodiment, the classification is achieved using a DenseNet 3-D convolutional neural network.

In one embodiment, the localization layer 105 includes 33 class semantic segmentation in 3D. In one embodiment, the system is configured to classify each voxel as one of 32 teeth or background and resulting segmentation assigns each voxel to one of 33 classes. In another embodiment, the system is configured to classify each voxel as either tooth or other anatomical structure of interest. In case of localizing only teeth, the classification includes, but not limited to, 2 classes. Then individual instances of every class (teeth) could be split, e.g. by separately predicting a boundary between them. In some embodiments, the anatomical structure being localized, includes, but not limited to, teeth, upper and lower jaw bone, sinuses, lower jaw canal and joint.

In one embodiment, the system utilizes fully-convolutional network. In another embodiment, the system works on downscaled images (typically from 0.1-0.2 mm voxel resolution to 1.0 mm resolution) and grayscale (1-channel) image (say, 1×100×100×100-dimensional tensor). In yet another embodiment, the system outputs 33-channel image (say, 33×100×100×100-dimensional tensor) that is interpreted as a probability distribution for non-tooth vs. each of 32 possible (for adult human) teeth, for every pixel.

In an alternative embodiment, the system provides 2-class segmentation, which includes labeling or classification, if the localization comprises tooth or not. The system additionally outputs assignment of each tooth voxel to a separate "tooth instance".

In one embodiment, the system comprises VNet predicting multiple "energy levels", which are later used to find boundaries. In another embodiment, a recurrent neural network could be used for step by step prediction of tooth, and keep track of the teeth that were outputted a step before. In yet another embodiment, Mask-RCNN generalized to 3D could be used by the system. In yet another embodiment, the system could take multiple crops from 3D image in original resolution, perform instance segmentation, and then join crops to form mask for all original image. In another embodiment, the system could apply either segmentation or object detection in 2D, to segment axial slices. This would allow to process images in original resolution (albeit in 2D instead of 3D) and then infer 3D shape from 2D segmentation.

In one embodiment, the system could be implemented utilizing descriptor learning in the multitask learning framework i.e., a single network learning to output predictions for multiple dental conditions. This could be achieved by balancing loss between tasks to make sure every class of every task has approximately the same impact on the learning. The loss is balanced by maintaining a running average gradient that network receives from every class*task and normalizing it. Alternatively, descriptor learning could be achieved by teaching network on batches consisting of data about a single condition (task) and sample examples into these batches in such a way that all classes will have same number of examples in batch (which is generally not possible in multitask setup). Further, standard data augmentation could be applied to 3D tooth images to perform scale, crop, rotation, vertical flips. Then, combining all augmentations and final image resize to target dimensions in a single affine transform and apply all at once.

Advantageously, in some embodiment, to accumulate positive cases faster, weak model could be trained and run the model on all of unlabeled data. From resulting predictions, teeth model that gives high scores on some rare pathology of interest are selected. Then, the teeth are sent to be labelled by humans or users and added to the dataset (both positive and negative human labels). This allows to quickly and cost-efficiently build up more balanced dataset for rare pathologies.

In some embodiments, the system could use coarse segmentation mask from localizer as an input instead of tooth image. In some embodiments, the descriptor could be trained to output fine segmentation mask from some of the intermediate layers. In some embodiments, the descriptor could be trained to predict tooth number.

As an alternative to multitask learning approach, "one network per condition" could be employed, i.e. models for different conditions are completely separate models that share no parameters. Another alternative is to have a small shared base network and use separate subnetworks connected to this base network, responsible for specific conditions/diagnoses.

Figure 2A:
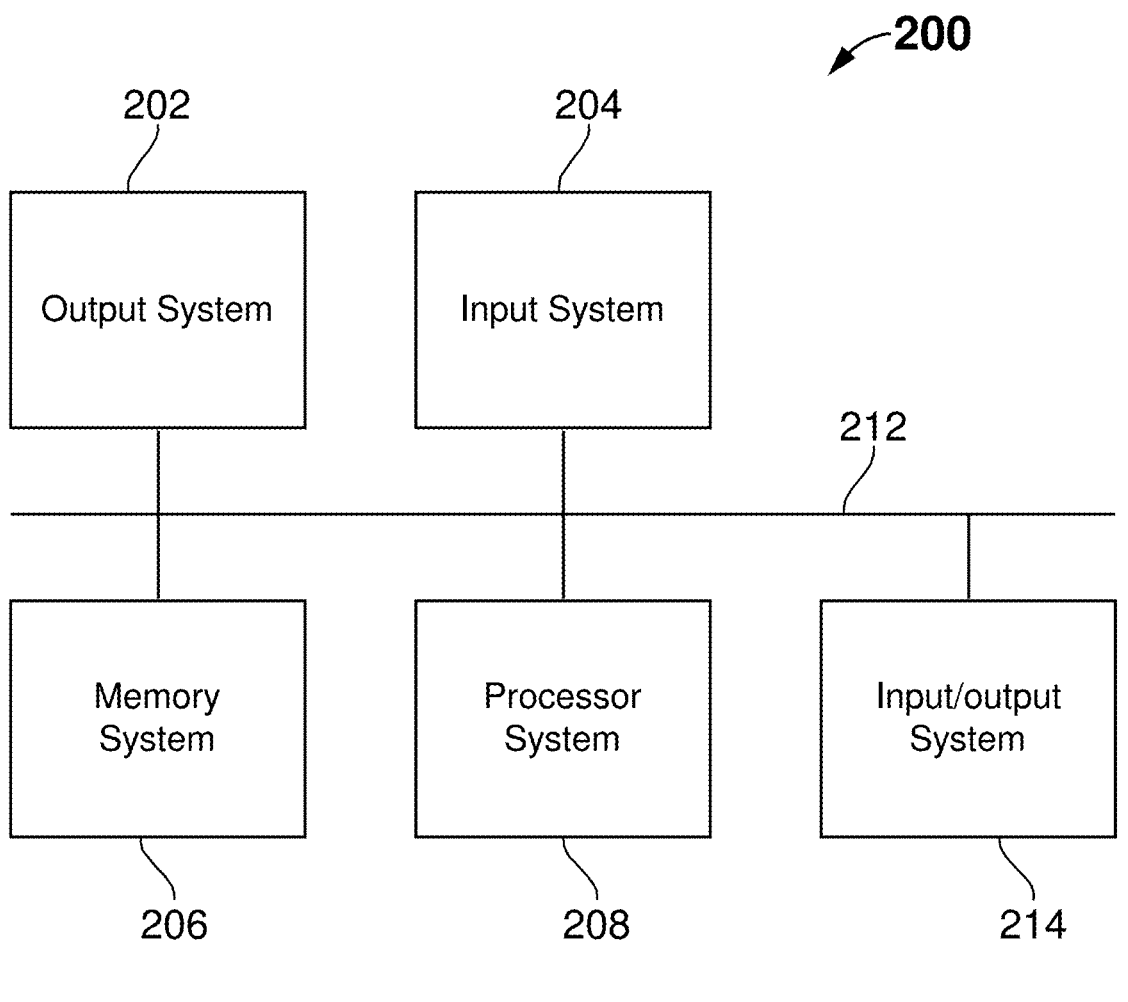
FIG. 2A illustrates in a block diagram, an automated parsing pipeline system for anatomical localization and condition classification according to yet another embodiment.
Figure 2B:
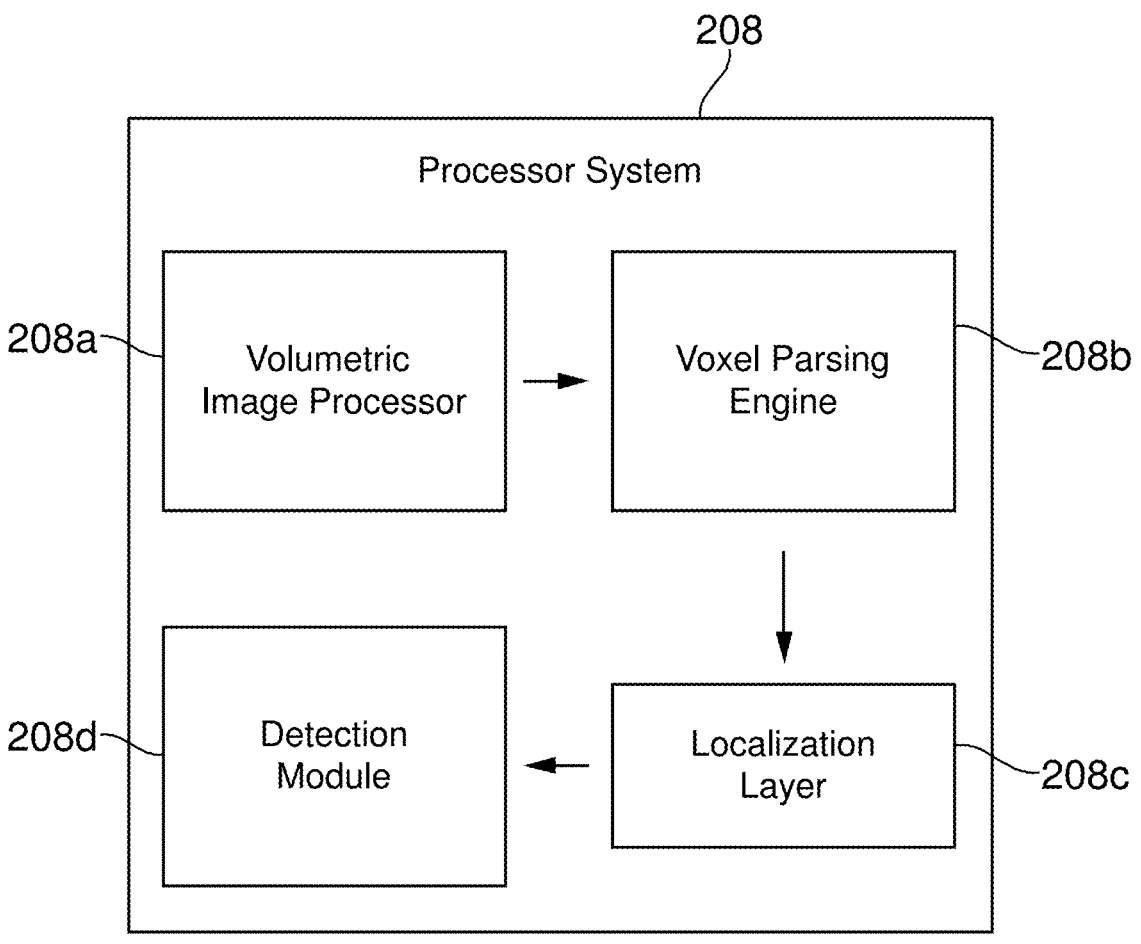
FIG. 2B illustrates in a block diagram, a processor system according to an embodiment.

FIG. 2A illustrates in a block diagram 200, an automated parsing pipeline system for anatomical localization and condition classification according to yet another embodiment. In an embodiment, the system comprises an input system 204, an output system 202, a memory system or unit 206, a processor system 208, an input/output system 214 and an interface 212. Referring to FIG. 2B, the processor system 208 comprises a volumetric image processor 208a, a voxel parsing engine 208b in communication with the volumetric image processor 208a, a localization layer 208c in communication with the voxel parsing engine 208 and a detection module 208d in communication with the localization module 208c. The processor 208 is configured to receive at least one volumetric image via an input system 202. At least one received volumetric image comprise a 3-D pixel array. The 3-D pixel array is pre-processed to convert into an array of Hounsfield Unit (HU) radio intensity measurements. Then, the processor 208 is configured to parse the received volumetric image data into at least a single image frame field of view by the said volumetric image processor 208a.

The anatomical structures residing in the at least single field of view is localized by assigning each voxel a distinct anatomical structure by the voxel parsing engine 208b.

The processor 208 is configured to select all voxels belonging to the localized anatomical structure by finding a minimal bounding rectangle around the voxels and the surrounding region for cropping as a defined anatomical structure by the localization layer 208c. Then, the conditions for each defined anatomical structure within the cropped image is classified by a detection module or classification layer 208d.

Figure 3A:
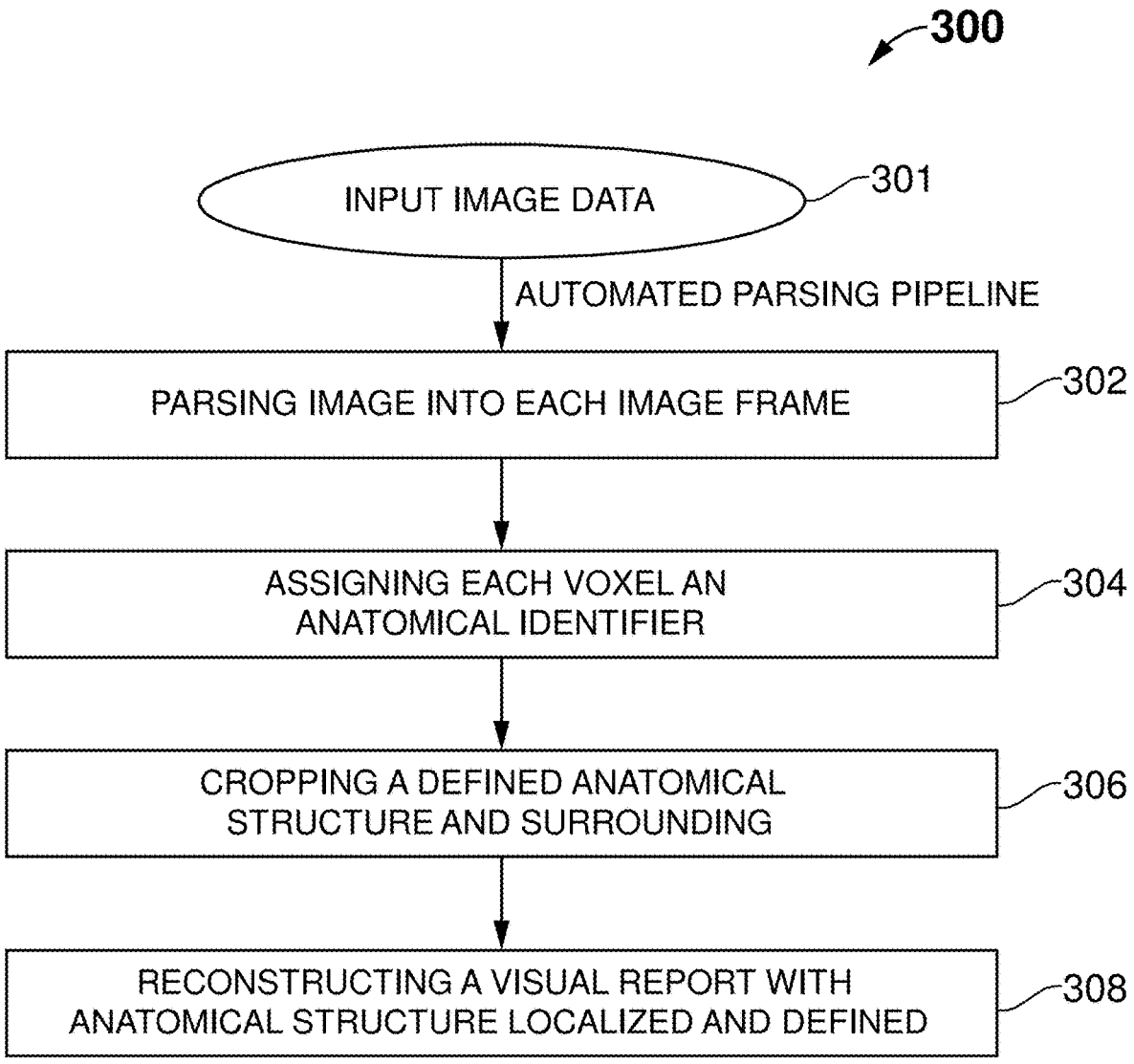
FIG. 3A. illustrates in a flow diagram, an automated parsing pipeline method for anatomical localization and condition classification, according to an embodiment.

FIG. 3A illustrates in a flow diagram 300, an automated parsing pipeline method for anatomical localization and condition classification, according to an embodiment. At step 301, an input image data is received. In one embodiment, the image data is a volumetric image data. At step 302, the received volumetric image is parsed into at least a single image frame field of view. The parsed volumetric image is pre-processed by controlling image intensity value.

At step 304, a tooth or anatomical structure inside the pre-processed and parsed volumetric image is localized and identified by tooth number. At step 306, the identified tooth and surrounding context within the localized volumetric image are extracted. At step 308, a visual report is reconstructed with localized and defined anatomical structure. In some embodiments, the visual reports include, but not limited to, an endodontic report (with focus on tooth's root/canal system and its treatment state), an implantation report (with focus on the area where the tooth is missing), and a dystopic tooth report for tooth extraction (with focus on the area of dystopic/impacted teeth).

Figure 3B:
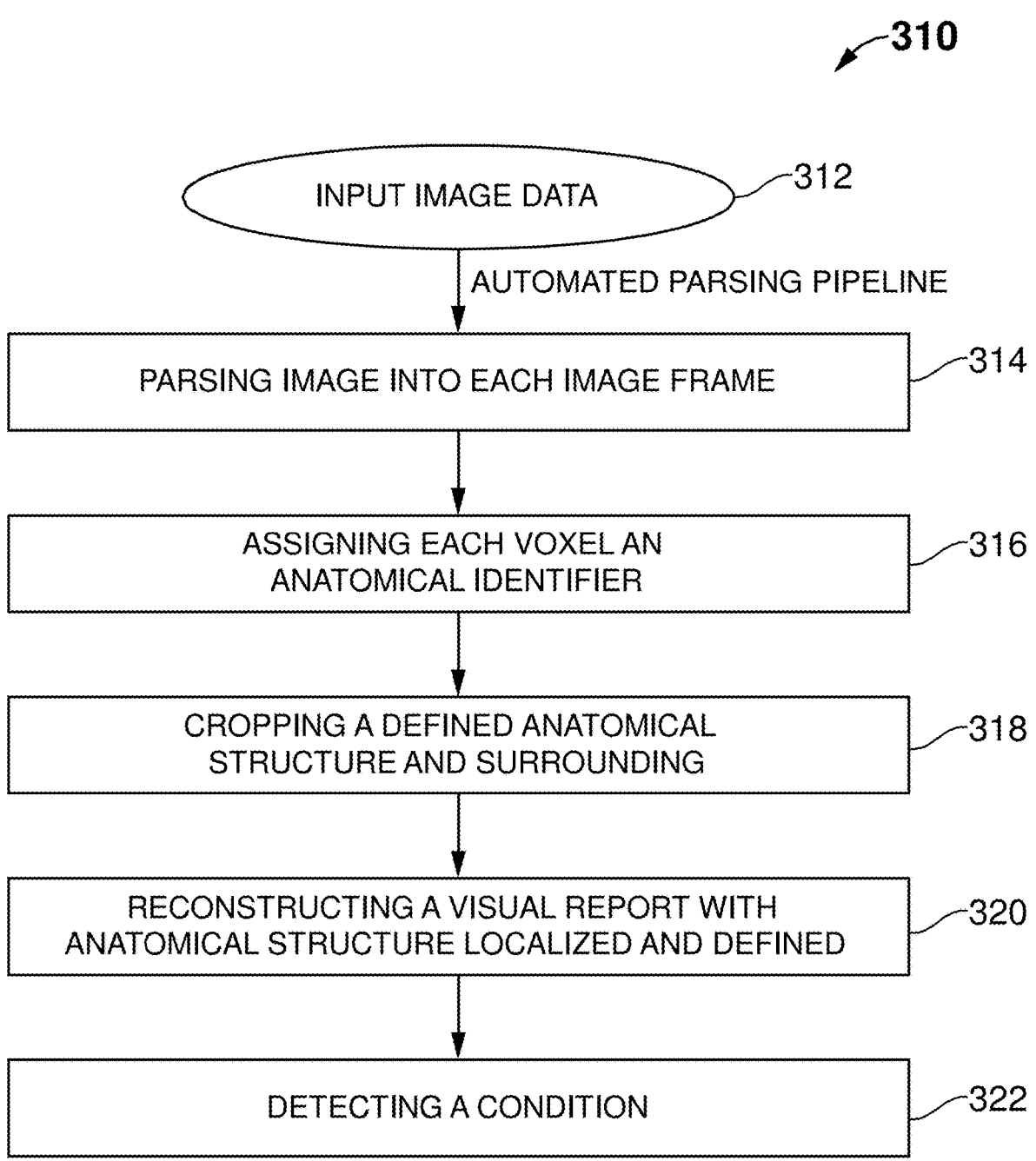
FIG. 3B illustrates in a flow diagram, an automated parsing pipeline method for anatomical localization and condition classification, according to another embodiment.

FIG. 3B illustrates in flow diagram 310, an automated parsing pipeline method for anatomical localization and condition classification, according to another embodiment. At step 312, at least one volumetric image data is received from a radio-image gathering source by a volumetric image processor.

At step 314, the received volumetric image data is parsed into at least a single image frame field of view by the volumetric image processor. At least single image frame field of view is pre-processed by controlling image intensity value by the volumetric image processor. At step 316, an anatomical structure residing in the at least single pre-processed field of view is localized by assigning each voxel a distinct anatomical structure ID by the voxel parsing engine. At step 318, all voxels belonging to the localized anatomical structure is selected by finding a minimal bounding rectangle around the voxels and the surrounding region for cropping as a defined anatomical structure by the localization layer. At step 320, a visual report is reconstructed with defined and localized anatomical structure. At step 322, conditions for each defined anatomical structure is classified within the cropped image by the classification layer.

Figure 4:
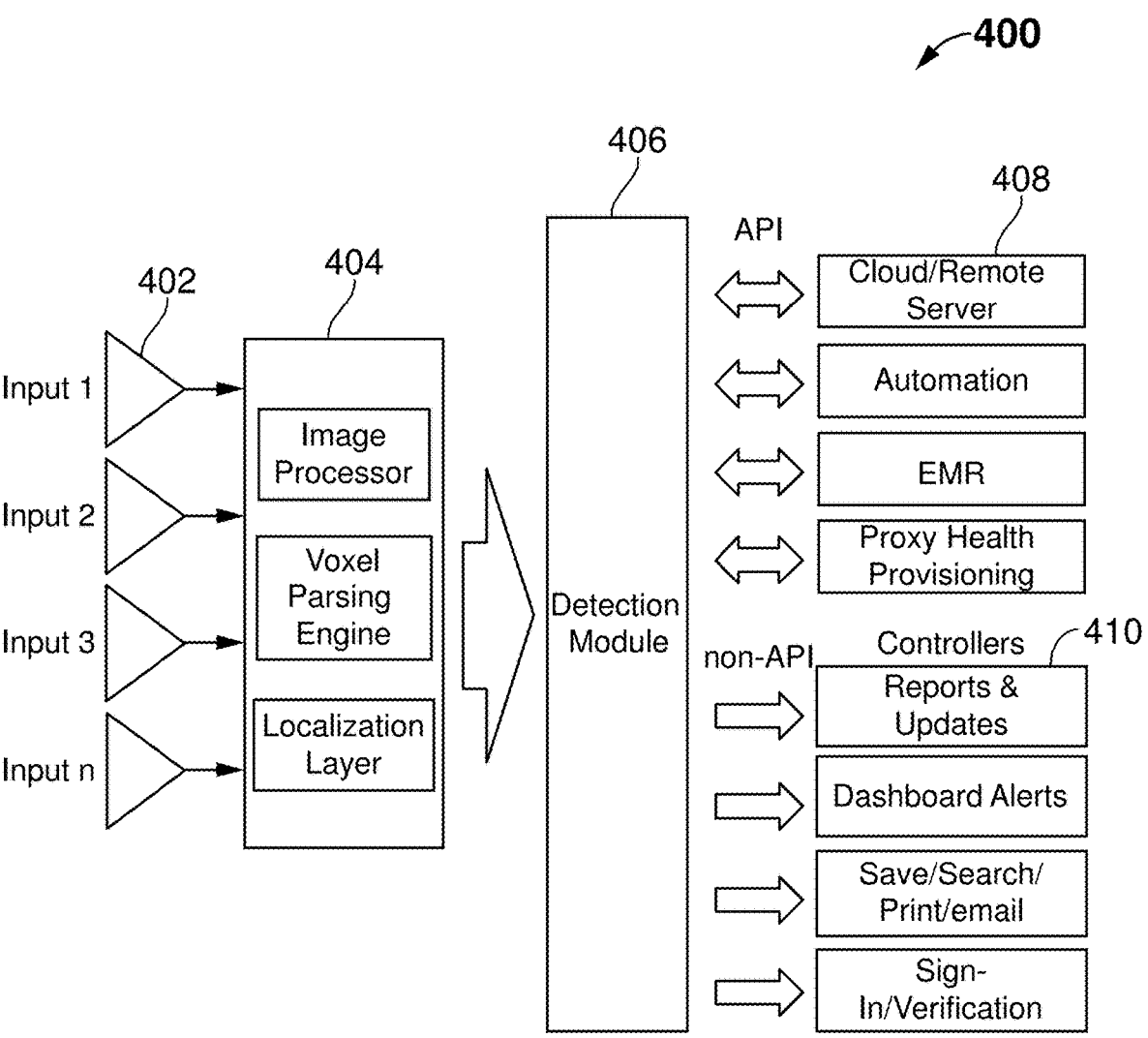
FIG. 4 illustrates in a block diagram, the automated parsing pipeline architecture according to an embodiment.

FIG. 4 illustrates in a block diagram 400, the automated parsing pipeline architecture according to an embodiment. According to an embodiment, the system is configured to receive input image data from a plurality of capturing devices, or input event sources 402. A processor 404 including an image processor, a voxel parsing engine and a localization layer. The image processor is configured to parse images into each image frame and preprocess the parsed image. The voxel parsing engine is configured to localize an anatomical structure residing in the at least single pre-processed field of view by assigning each voxel a distinct anatomical structure ID. The localization layer is configured to select all voxels belonging to the localized anatomical structure by finding a minimal bounding rectangle around the voxels and the surrounding region for cropping as a defined anatomical structure. The detection module 406 is configured to detect the condition of the defined anatomical structure. The detected condition could be sent to the cloud/remote server, for automation, to EMR and to proxy health provisioning 408. In another embodiment, detected condition could be sent to controllers 410. The controllers 410 includes reports and updates, dashboard alerts, export option or store option to save, search, print or email and sign-in/verification unit.

Figure 5:
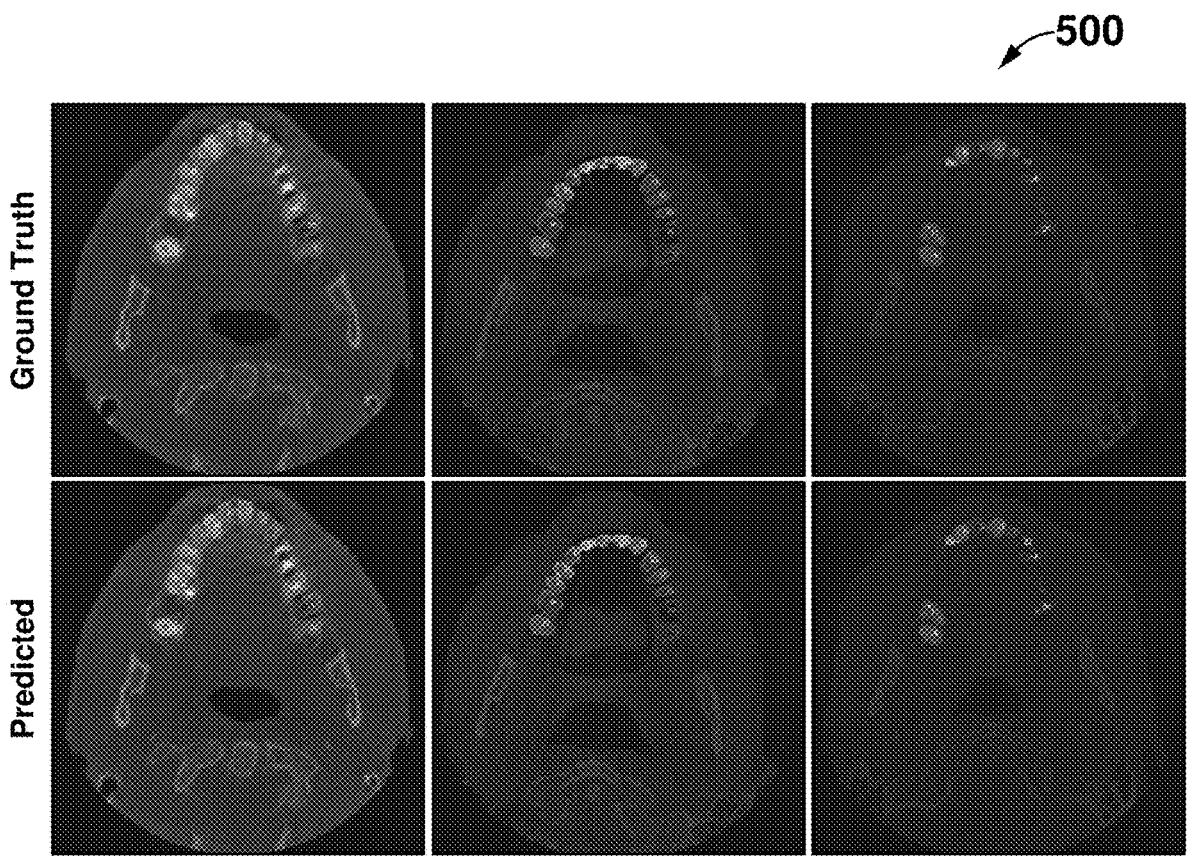
FIG. 5 illustrates in a screenshot, an example of ground truth and predicted masks in an embodiment of the present invention.

Referring to FIG. 5, an example screenshot 500 of tooth localization done by the present system, is illustrated. This figure shows examples of teeth segmentation at axial slices of 3D tensor.

Problem: Formulating the problem of tooth localization as a 33-class semantic segmentation. Therefore, each of the 32 teeth and the background are interpreted as separate classes.

Model: A V-Net-based fully convolutional network is used. V-Net is a 6-level deep, with widths of 32; 64; 128; 256; 512; and 1024. The final layer has an output width of 33, interpreted as a softmax distribution over each voxel, assigning it to either the background or one of 32 teeth. Each block contains 3*3*3 convolutions with padding of 1 and stride of 1, followed by ReLU non-linear activations and a dropout with 0:1 rate. Instance normalization before each convolution is used. Batch normalization was not suitable in this case, as long as there is only one example in batch (GPU memory limits); therefore, batch statistics are not determined.

Different architecture modifications were tried during the research stage. For example, an architecture with 64; 64; 128; 128; 256; 256 units per layer leads to the vanishing gradient flow and, thus, no training. On the other hand, reducing architecture layers to the first three (three down and three up) gives a comparable result to the proposed model, though the final loss remains higher.

Loss function: Let R be the ground truth segmentation with voxel values ri (0 or 1 for each class), and P the predicted probabilistic map for each class with voxel values pi. As a loss function we use soft negative multi-class Jaccard similarity, that can be defined as:

$$\text{Jaccard Multi class Loss} = 1 - \frac{1}{N}\sum_{i=0}^{N}\frac{p_i r_i + \epsilon}{p_i + r_i - p_i r_i + \epsilon'}$$

where N is the number of classes, which in our case is 32, and $\epsilon$ is a loss function stability coefficient that helps to avoid a numerical issue of dividing by zero. Then the model is trained to convergence using an Adam optimizer with learning rate of 1e-4 and weight decay 1e-8. A batch size of 1 is used due to the large memory requirements of using volumetric data and models. The training is stopped after 200 epochs and the latest checkpoint is used (validation loss does not increase after reaching the convergence plateau).

Results: The localization model is able to achieve a loss value of 0:28 on a test set. The background class loss is 0:0027, which means the model is a capable 2-way "tooth/not a tooth" segmentor. The localization intersection over union (IoU) between the tooth's ground truth volumetric bounding box and the model-predicted bounding box is also defined. In the case where a tooth is missing from ground truth and the model predicted any positive voxels (i.e. the ground truth bounding box is not defined), localization IoU is set to 0. In the case where a tooth is missing from ground truth and the model did not predict any positive voxels for it, localization IoU is set to 1. For a human-interpretable metric, tooth localization accuracy which is a percent of teeth is used that have a localization IoU greater than 0:3 by definition. The relatively low threshold value of 0:3 was decided from the manual observation that even low localization IoU values are enough to approximately localize teeth for the downstream processing. The localization model achieved a value of 0:963 IoU metric on the test set, which, on average, equates to the incorrect localization of 1 of 32 teeth.

Figures 6A, 6B, 6C:
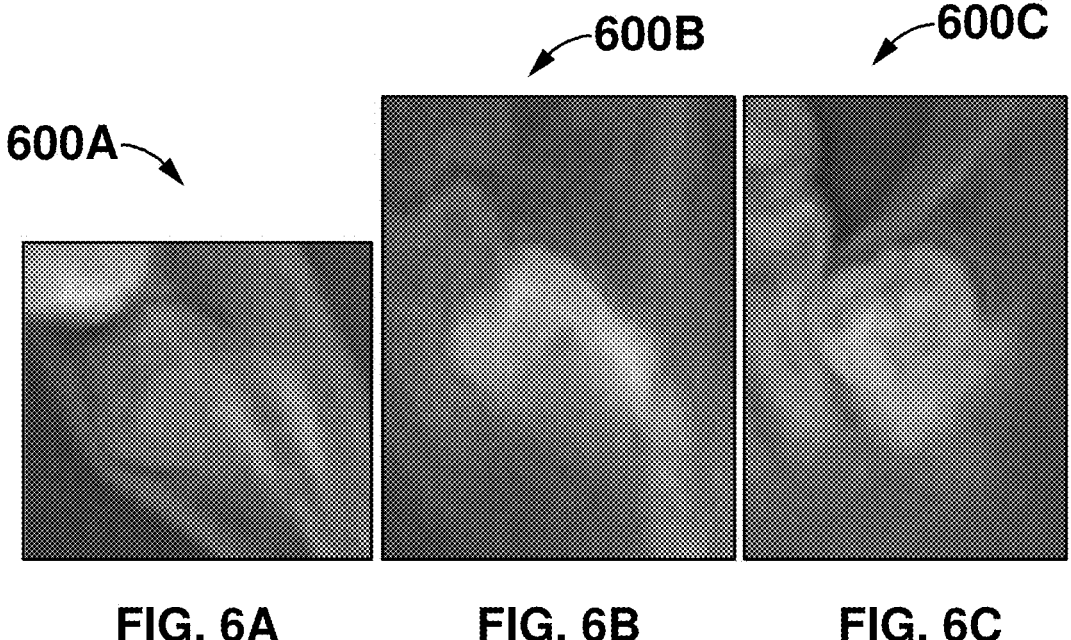
FIGS. 6A, 6B & 6C illustrates in a screenshot, the extraction of anatomical structure by the localization model of the system in an embodiment of the present invention.

Referring to FIGS. 6A-6C, an example screenshot (600A, 600B, 600B) of tooth sub-volume extraction done by the present system, illustrated.

In order to focus the downstream classification model on describing a specific tooth of interest, the tooth and its surroundings is extracted from the original study as a rectangular volumetric region, centered on the tooth. In order to get the coordinates of the tooth, the upstream segmentation mask is used. The predicted volumetric binary mask of each tooth is preprocessed by applying erosion, dilation, and then selecting the largest connected component. A minimum bounding rectangle is found around the predicted volumetric mask. Then, the bounding box is extended by 15 mm vertically and 8 mm horizontally (equally in all directions) to capture the tooth context and to correct possibly weak localizer performance. Finally, a corresponding sub-volume is extracted from the original clipped image, rescale it to 643 and pass it on to the classifier. An example of a sub-volume bounding box is presented in FIGS. 6A-6C.

Figure 7:
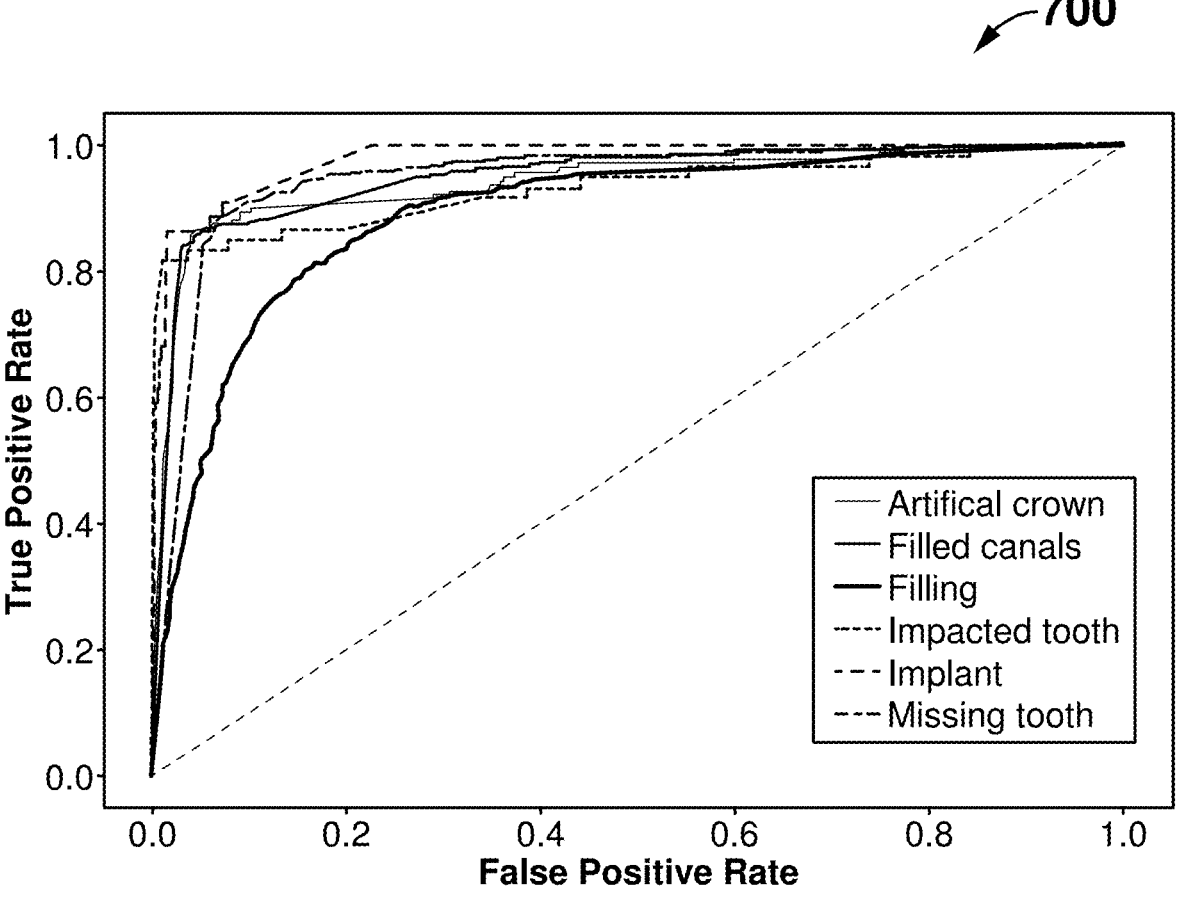
FIG. 7 illustrates in a graph, receiver operating characteristic (ROC) curve of a predicted tooth condition in an embodiment of the present invention.

Referring to FIG. 7, a receiver operating characteristic (ROC) curve 700 of a predicted tooth condition is illustrated.

Model: The classification model has a DenseNet architecture. The only difference between the original and implementation of DenseNet by the present invention is a replacement of the 2D convolution layers with 3D ones. 4 dense blocks of 6 layers is used, with a growth rate of 48, and a compression factor of 0:5. After passing the 643 input through 4 dense blocks followed by down-sampling transitions, the resulting feature map is 548×2×2×2. This feature map is flattened and passed through a final linear layer that outputs 6 log its—each for a type of abnormality.

Figure 8:
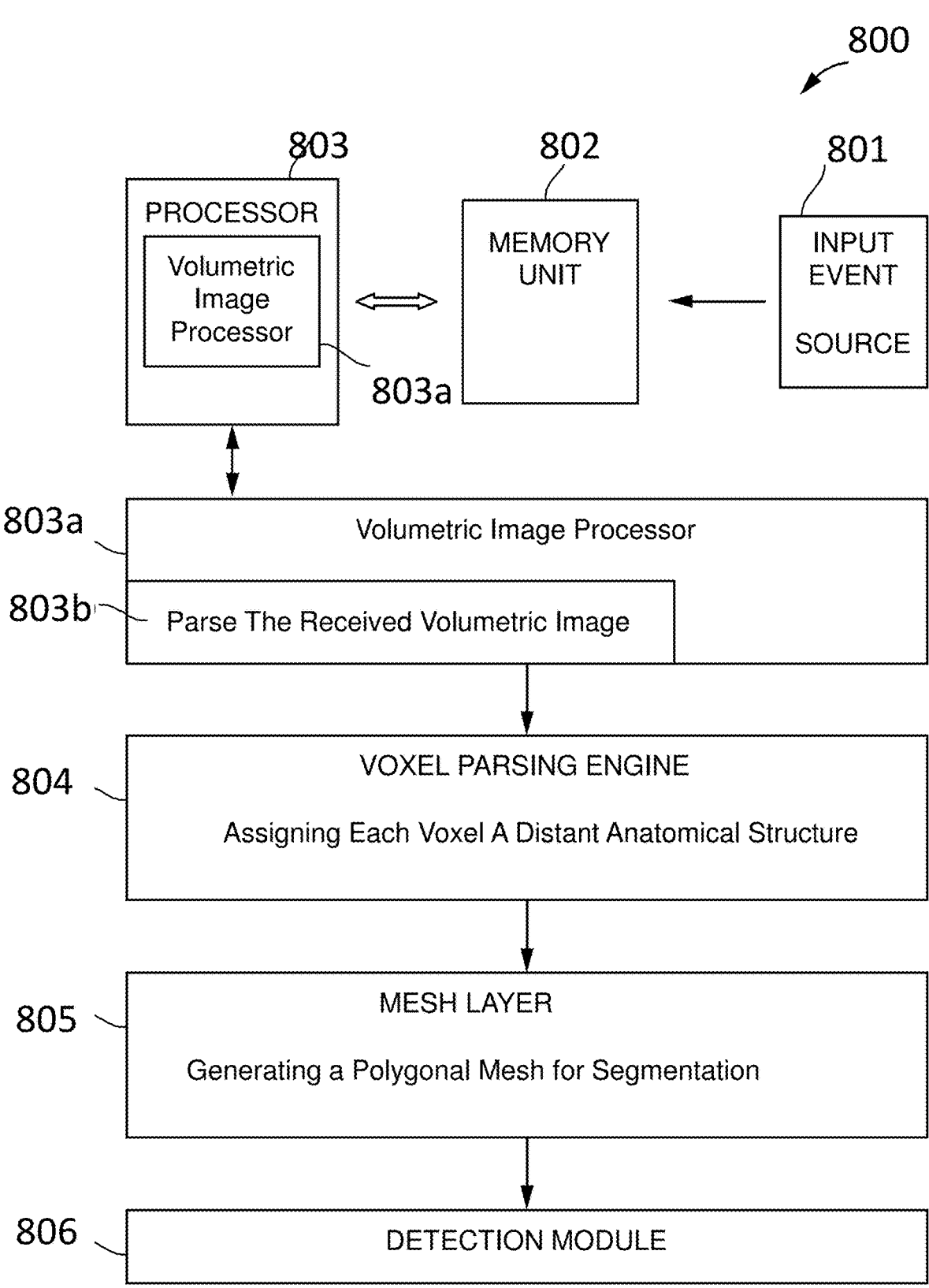
FIG. 8 illustrates in a block diagram, the automated segmentation pipeline according to an embodiment.

Loss function: Since tooth conditions are not mutually exclusive, binary cross entropy is used as a loss. To handle class imbalance, weight each condition loss inversely proportional to its frequency (positive rate) in the training set. Suppose that $F_i$ is the frequency of condition i, $p_i$ is its predicted probability (sigmoid on output of network) and $t_i$ is ground truth. Then: $L_i=(1-F_i) \cdot t_i \cdot \log p_i+F_i \cdot (1-t_i) \cdot \log(1-p_i)$ is the loss function for condition i. The final example loss is taken as an average of the 6 condition losses.

dance with an exemplary embodiment of the this alternative automated segmentation pipeline, as illustrated by FIG. 8, the memory unit 802 is a non-transitory storage element storing encoded information, when implemented by the processor 803, configure the automated pipeline system to localize/segment an anatomical structure, and optionally, classify the condition of the localized anatomical structure. In one embodiment, an input data (volumetric image) is provided via the input event source 801 (volumetric image gathering source—CBCT, etc.). In one embodiment, the input data is a volumetric image data and the input event source 801 is a radio-image gathering source. In one embodiment, the input data is 2D image data. In another embodiment, the volumetric image data comprises a 3-D pixel array. The volumetric image processor 803a is configured to receive the volumetric image data from the image gathering source—and optionally process or stage for processing the received image for at least one of parsing/segmentation/localization/classification.

The processor 803 is further configured to parse at least one received volumetric image data 803b into at least a single image frame field of view by the volumetric image processor and further configured to localize anatomical structures residing in the single image frame field of view by assigning each voxel a distinct anatomical structure by the voxel parsing engine 804. Optionally, in one embodiment, the single image frame field of view may be pre-processed for segmentation/localization, which involves rescaling using linear interpolation. The pre-processing involves use of any one of a normalization schemes to account for variations in image value intensity depending on at least one of an input or output of volumetric image. In one embodiment, localization/segmentation is achieved using a V-Net-based fully convolutional neural network. In one embodiment, the V-Net is a 3D generalization of UNet.

The processor 803 is further configured to select all voxels belonging to the localized anatomical structure. The processor 803 is configured to parse the received volumetric image data into at least a single image frame field of view by the said volumetric image processor 803a. The anatomical structures residing in the at least single field of view is localized by assigning each voxel a distinct anatomical structure (identifier) by the voxel parsing engine 803b. The distribution-based approach is an alternative to the minimum bounding box approach detailed in earlier figure descriptions above: selecting all voxels belonging to the localized anatomical structure by finding a minimal bounding rectangle around the voxels and the surrounding region for cropping

|  | Artificial crowns | Filling canals | Filling | Impacted tooth | Implant | Missing |
|---|---|---|---|---|---|---|
| ROC AUC | 0.941 | 0.95 | 0.892 | 0.931 | 0.979 | 0.946 |
| Condition frequency | 0.092 | 0.129 | 0.215 | 0.018 | 0.015 | 0.145 |

Results: The classification model achieved average area under the receiver operating characteristic curve (ROC AUC) of 0:94 across the 6 conditions. Per-condition scores are presented in above table. Receiver operating characteristic (ROC) curves 700 of the 6 predicted conditions are illustrated in FIG. 7.

The automated segmentation pipeline may segment/localize volumetric images by distinct anatomical structure/identifiers based on a distribution approach, versus a bounding box approach described in detail above. In accoras a defined anatomical structure by the localization layer. Whether segmented based on distribution or bounding box, the conditions for each defined anatomical structure within the cropped/segmented/mesh-converted image may then be optionally classified by a detection module or classification layer 806.

In a preferred embodiment, the processor is configured for receiving a volumetric image comprising a jaw/tooth structure in terms of voxels; and defining each voxel a distinct anatomical identifier based on a probabilistic distribution for each of an anatomical structure. Apply a computer segmentation model to output probability distribution or discrete assignment of each voxel in the image to one or more classes (probabilistic of discrete segmentation).

In one embodiment, the voxel parsing engine 803b or a localization layer (not shown) may perform 33 class semantic segmentation in 3D for dental volumetric images. In one embodiment, the system is configured to classify each voxel as one of 32 teeth or background and the resulting segmentation assigns each voxel to one of 33 classes. In another embodiment, the system is configured to classify each voxel as either tooth or other anatomical structure of interest. In the case of localizing only teeth, the classification includes, but not limited to, 2 classes. Then individual instances of every class (teeth) could be split, e.g., by separately predicting a boundary between them. In some embodiments, the anatomical structure being localized, includes, but not limited to, teeth, upper and lower jaw bone, sinuses, lower jaw canal and joint.

For example, each tooth in a human may have a distinct number based on its anatomy, order (1-8), and quadrant (upper, lower, left, right). Additionally, any number of dental features (maxilla, mandible, mandibular canal, sinuses, airways, outer contour of soft tissue, etc.) constitute a distinct anatomical structure that can be unambiguously coded by a number.

In one embodiment, a model of a probability distribution over anatomical structures via semantic segmentation may be performed: using a standard fully-convolutional network, such as VNet or 3D UNet, to transform $I \times H \times W \times D$ tensor of input image with I color channels per voxel, to $H \times W \times D \times C$ tensor defining class probabilities per voxel, where C is the number of possible classes (anatomical structures). In the case where classes do not overlap, this could be converted to probabilities via applying a softmax activation along the C dimension. In case of a class overlap, a sigmoid activation function may be applied to each class in C independently.

Alternatively, an instance or panoptic segmentation may be applied to potentially identify several distinct instances of a single class. This works both for cases where there is no semantic ordering of classes (as in case 1, which can be alternatively modeled by semantic segmentation), and for cases where there is no natural semantic ordering of classes, such as in segmenting multiple caries lesions on a tooth. Instance or Panoptic segmentation could be achieved, for example, by using a fully-convolutional network to obtain several outputs tensors:

S: $H \times W \times D \times C$ semantic segmentation output

C: $H \times W \times D \times 1$ centerness output, which defines probability that a voxel is a center of a distinct instance of a class, which is defined by S O: $H \times W \times D \times 3$ offset output, which for each voxel defined an offset to point to a centroid predicted by C S output gets converted to a probability distribution over classes for each voxel by applying a Softmax activation function. Argmax over S gives the discrete classes assignment.

C output gets converted to a centroid instances by:

Applying a sigmoid to get a probability of instance at this voxel

Applying of some threshold to reject definite negatives (we used 0.1)

Applying Non-Maximum-Suppression (NMS)-like procedure of keeping only voxels that have higher probability than their neighbours (each voxel have $3 \times 3 \times 3 - 1 = 26$ neighbours)

Centroids are assigned class and also filtered by a semantic classification from S.

Remaining positive voxels are recorded by their 3D coordinate as instance centroids.

O output assigns each voxel to a centroid by:

Filtering only non-background voxels from S

Obtaining predicted instance centroid for instance to which this voxel belongs, by taking a sum of a coordinate of the voxel with its predicted offset Selecting the centroid from C closest to the predicted location.

After these steps, we obtain an assignment of each voxel to object instance, and assignment of instances to classes. Again, while not shown, the automated segmentation pipeline system may further comprise a detection module. The detection module is configured to detect or classify the conditions for each defined anatomical structure within the cropped image by a detection module or classification layer. In one embodiment, the classification is achieved using a DenseNet 3-D convolutional neural network. In continuing reference to FIG. 8, a mesh layer or module 805 may be configured to convert probabilistic or discrete segmentation to a polygonal mesh for each class by applying a volume-to-mesh conversion algorithm (such as marching cubes, stainer triangulation, flying edges, etc.).

Figure 9:
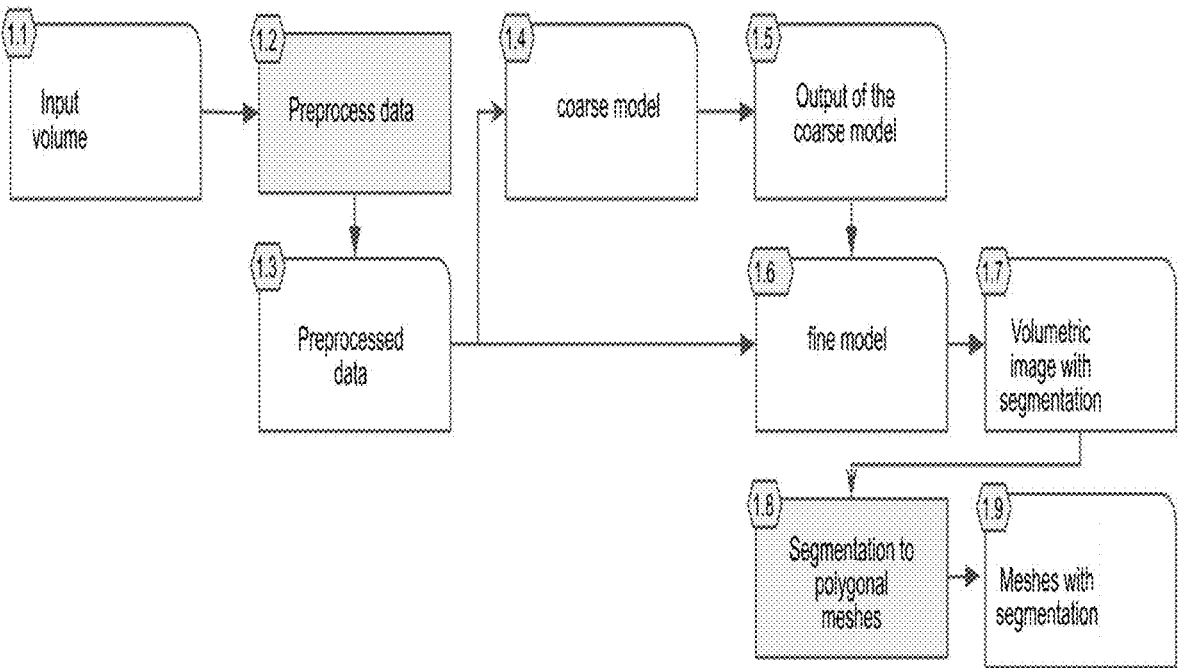
FIG. 9 illustrates in a block diagram, the automated segmentation pipeline according to an embodiment.
Figure 10:
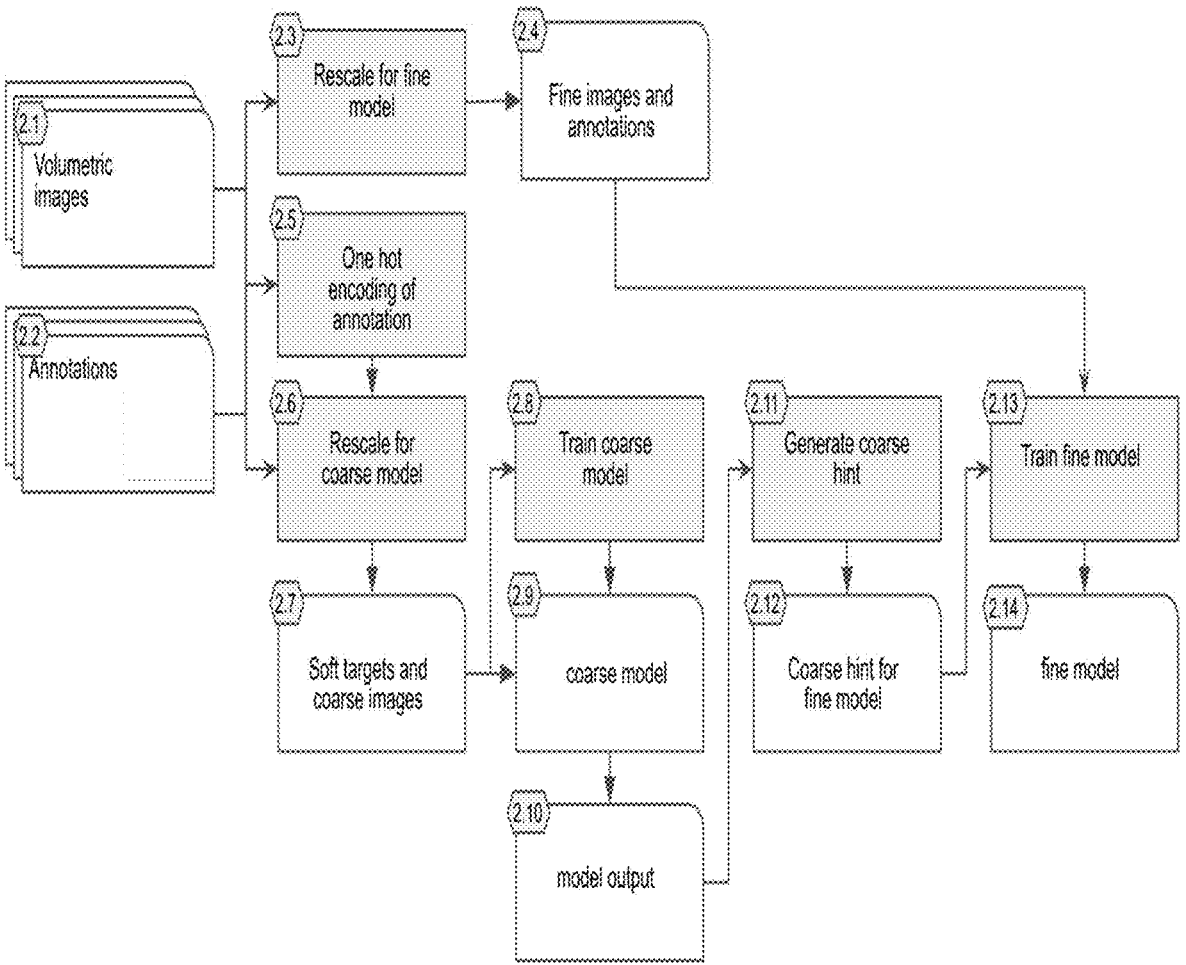
FIG. 10 illustrates in a block diagram, the automated segmentation pipeline according to an embodiment.

FIGS. 9 and 10 both illustrate an exemplary flow diagram detailing the automatic segmentation flow involving coarse input images into a coarse and fine model. The use of coarse and fine models allow defining large structures on coarse scale and then refining borders for allowing practitioners to detect small objects in fine scale. As FIGS. 9 and 10 illustrate, a volumetric image is uploaded (1.1) to a device, then it is preprocessed (1.2) so that it can be fed to the trained coarse model and to the fine model. To apply the coarse model, one should rescale data to the appropriate step, and do the same for the fine model. Preprocessed data (1.3) is then passed to the coarse model (1.4) and its prediction (1.5) combined with preprocessed raw data (1.3), which is then passed to the fine model (1.6). Predictions of the fine model with minor postprocessing are then rescaled to the input size resulting in the volumetric image with segmented objects on it (1.7). This prediction can be used by a specialist as is, but then optionally, the system may convert the segmentation to a polygonal mesh for each class by applying a volume-to-mesh conversion algorithm (such as marching cubes, stainer triangulation, flying edges, etc.).

The fine model runs in higher resolution than the coarse model, and typically cannot process the image as a whole. Hence, two techniques are proposed to split volumes in sub-images:

Patch-Based Approach:

a. Split the image into a set of overlapping or non-overlapping patches that cover the whole image.

b. Combine each patch with the corresponding region of the coarse output (hint).

c. Run the combined image patch with hint through the fine model, obtaining fine output. The fine output per patch is then combined to reconstruct the fine output for the whole image.

d. In case of overlapping patches the output is averaged on regions of intersection. Averaging could be done with or without weights, where weights are increasing towards the center of the patch and falling towards its boundary.

Region of Interest Approach (RoI):

a. Based on the output of the coarse model (segmentation of objects of interest in coarse resolution), select regions corresponding to the objects of interest.

b. Select input volume regions corresponding to this region.

c. Select coarse output part corresponding to this region.

d. Combine input volume RoI part and coarse output RoI part and run them together through the fine model to obtain a fine model output for the object of interest.

e. Combine multiple fine per-object outputs into a single fine step output corresponding to the whole image.

Figure 11:
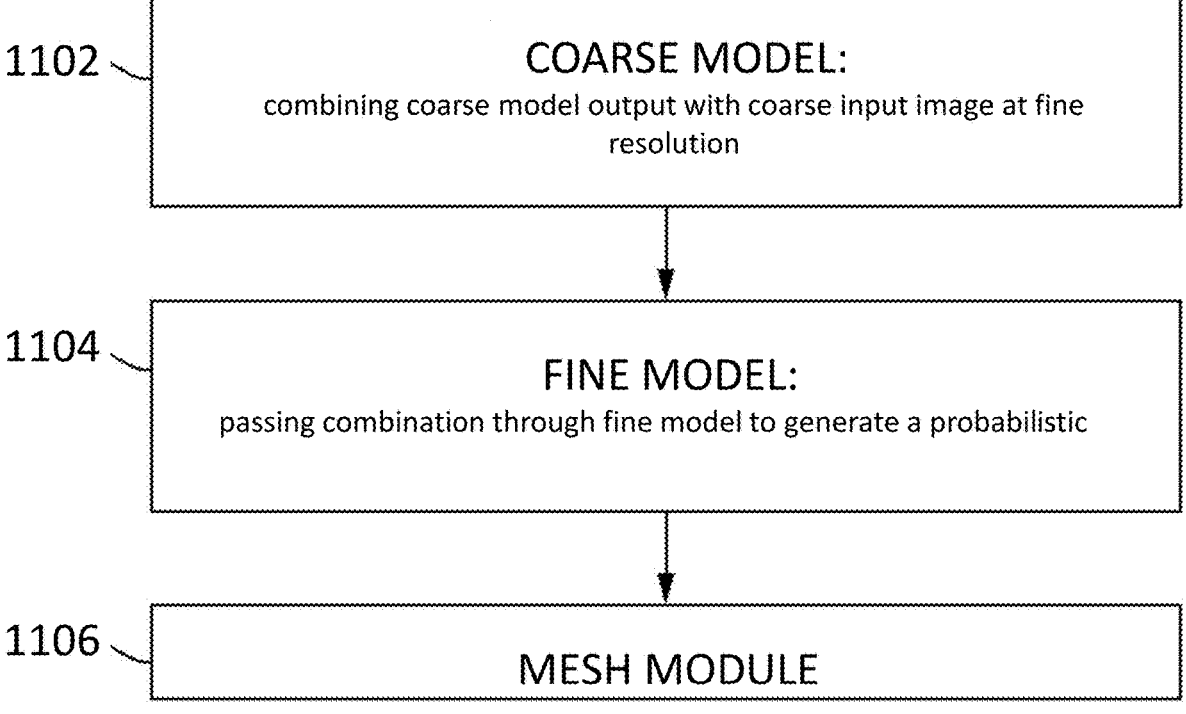
FIG. 11 illustrates in a flow diagram, the automated segmentation pipeline according to an embodiment.

FIG. 11 represents an illustrative method flow diagram, detailing the steps entailed in automatically segmenting dental volumetric images. At least one volumetric image data is received from an image gathering source and is parsed into at least a single image frame field of view by the volumetric image processor. The received image may optionally be pre-processed by controlling image intensity value by the volumetric image processor. At step 1102, combining a coarse model output with a coarse input image at fine resolution for a coarse output; passing the output through a fine model to generate the probability 1104. Optionally, the probability may then be applied through a mesh layer or module for generating a polygonal mesh with segmentation. Also, optionally (not shown), a visual report may be reconstructed with defined and localized anatomical structure. Also optionally, each defined anatomical structure may be classified in terms of condition/treatment plan by the classification layer/detection module.

Figure 12A:
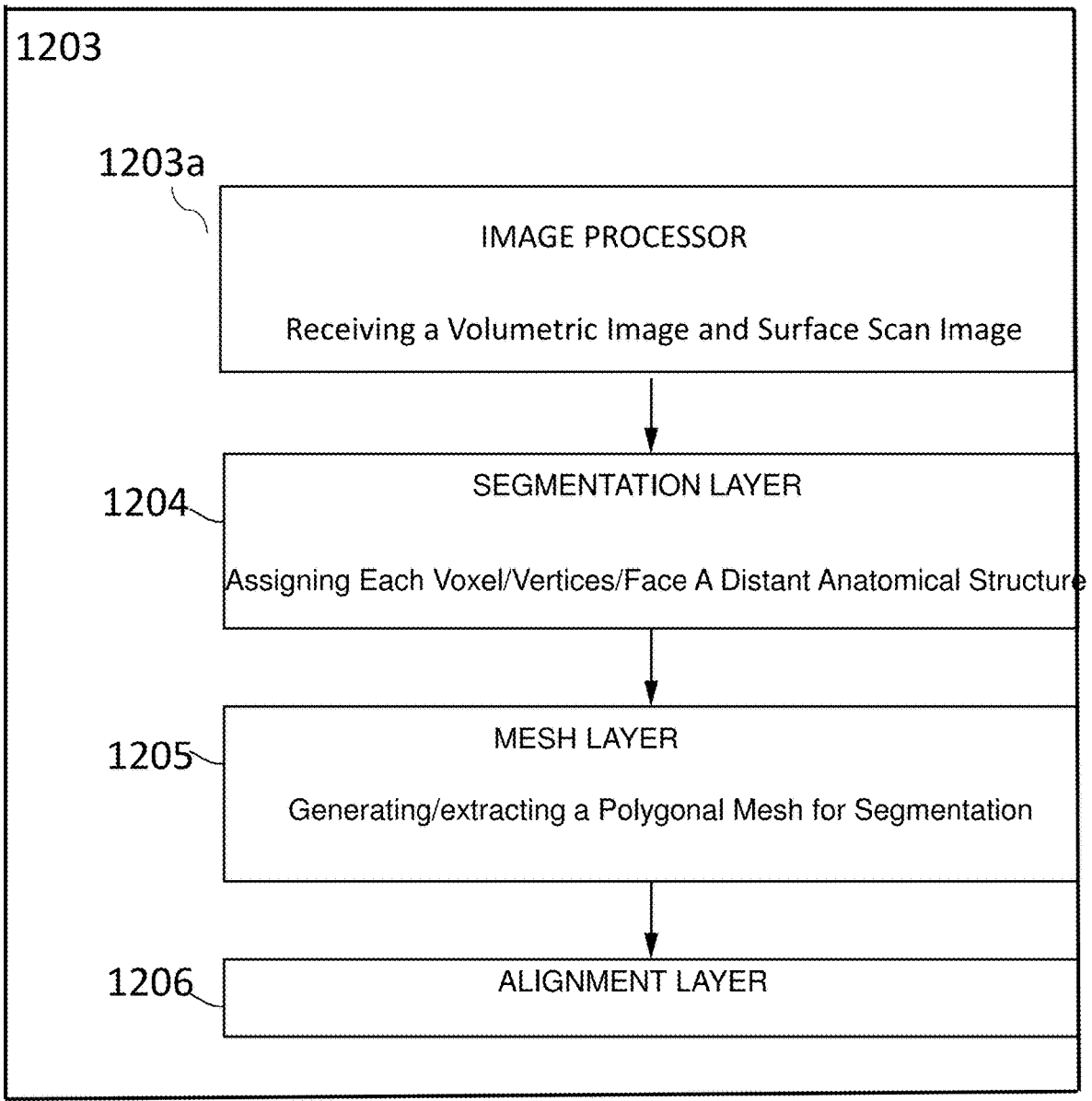
FIG. 12A illustrates in a block diagram, the automated alignment pipeline according to an aspect of the invention.
Figure 12B:
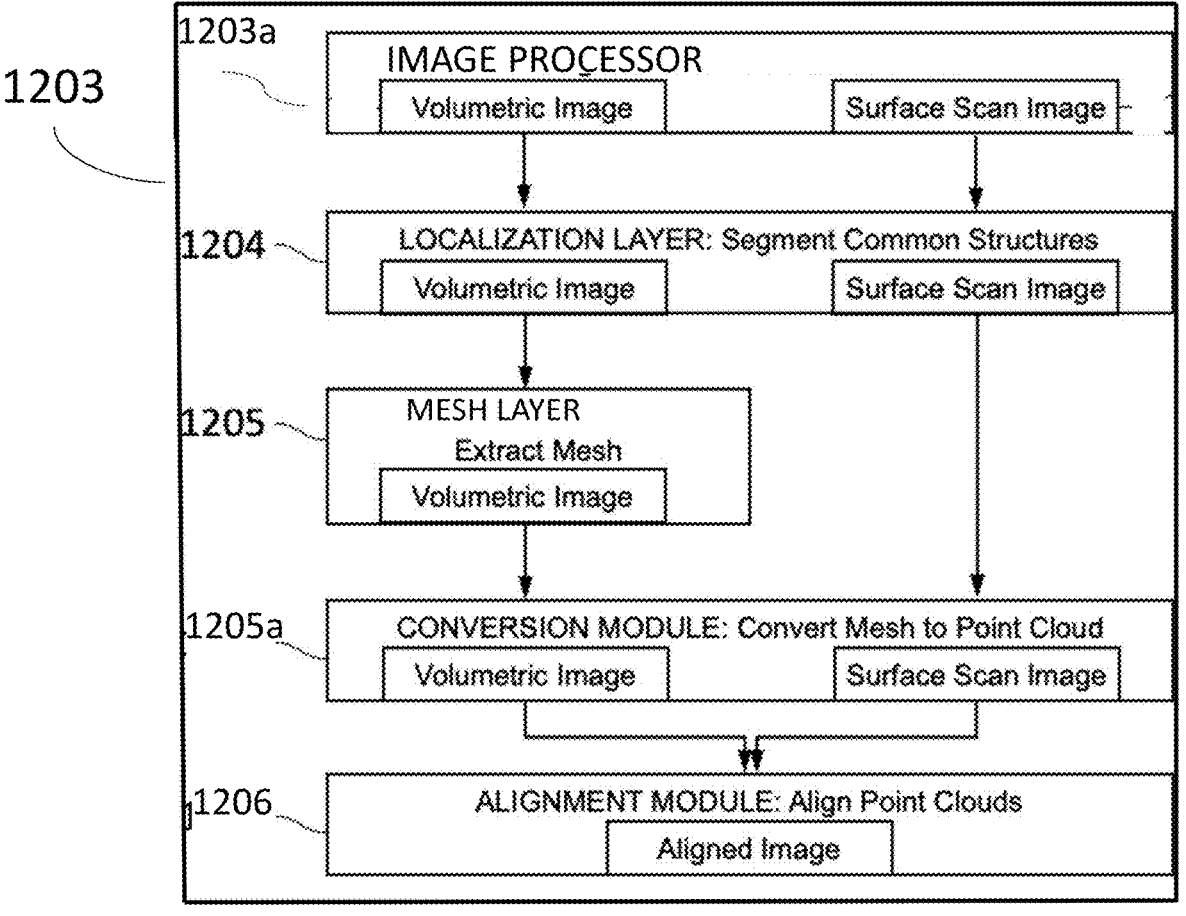
FIG. 12B illustrates in a block diagram, the automated alignment pipeline according to an aspect of the invention.

Now in reference to FIGS. 12A and 12B, which each illustrate in block diagram form, an exemplary system and method for the automated and AI-aided alignment of volumetric images and surface scan images for improved dental diagnostics. FIG. 12A/12B illustrates a block diagram of the system comprising an input event source; a memory unit in communication with the input event source; a processor 1203 in communication with the memory unit; an image processor 1203a in communication with the processor 1203; a localizing layer or segmenting layer 1204 in communication with the mesh module 1205 and alignment module 1206. In an embodiment, the memory unit is a non-transitory storage element storing encoded information. The encoded instructions when implemented by the processor 1203, configure the automated alignment system to segment and align a volumetric image with a surface scan image for improved visual details/diagnostics.

In one embodiment, an input data is provided via the input event source. In one embodiment, the input data is a volumetric image data and/or surface scan image and the input event source is any one of an image gathering source. In one embodiment, the input data is 2D image data. In another embodiment, the volumetric and/or surface scan image data comprises 3-D voxel array. In another embodiment, the volumetric image received from the input source may be a three-dimensional voxel array of a maxillofacial anatomy of a patient and the surface scan image received may be a polygonal mesh corresponding to the maxillofacial anatomy of the same patient. The image processor 1203a is configured to receive the image data from the image gathering source. In one embodiment, the image data is pre-processed, which involves conversion of 3-D pixel array into an array of Hounsfield Unit (HU) radio intensity measurements.

The processor 1203 is further configured to localize/segment anatomical structures residing in the single image frame field of view by assigning each voxel/pixel/face/vertex/vertices a distinct anatomical structure by the segmentation or localization layer 1204. In one embodiment, the single image frame field of view is pre-processed for localization, which involves rescaling using linear interpolation (not shown). The pre-processing 1203b involves use of any one of a normalization schemes to account for variations in image value intensity depending on at least one of an input or output of volumetric image.

In one embodiment, the localization layer 1204 may perform 33 class semantic segmentation in 3D for dental volumetric images. In one embodiment, the system is configured to classify each voxel as one of 32 teeth or background and the resulting segmentation assigns each voxel to one of 33 classes. In another embodiment, the system is configured to classify each voxel as either tooth or other anatomical structure of interest. In the case of localizing only teeth, the classification includes, but not limited to, 2 classes. Then individual instances of every class (teeth) could be split, e.g., by separately predicting a boundary between them. In some embodiments, the anatomical structure being localized, includes, but not limited to, teeth, upper and lower jaw bone, sinuses, lower jaw canal and joint. Segmentation/localization entails, according to a certain embodiment, selecting for all voxels belonging to the localized anatomical structure by finding a minimal bounding rectangle around the voxels and the surrounding region.

In one embodiment, a model of a probability distribution over anatomical structures via semantic segmentation may be performed: using a standard fully-convolutional network, such as VNet or 3D UNet, to transform I×H×W×D tensor of input image with I color channels per voxel, to H×W×D×C tensor defining class probabilities per voxel, where C is the number of possible classes (anatomical structures). In the case where classes do not overlap, this could be converted to probabilities via applying a softmax activation along the C dimension. In case of a class overlap, a sigmoid activation function may be applied to each class in C independently.

Alternatively, an instance or panoptic segmentation may be applied to potentially identify several distinct instances of a single class. This works both for cases where there is no semantic ordering of classes (as in case 1, which can be alternatively modeled by semantic segmentation), and for cases where there is no natural semantic ordering of classes, such as in segmenting multiple caries lesions on a tooth.

In continuing reference to FIG. 12A/12B, the segmentation layer 1204 segments the volumetric image and surface scan image into a set of distinct anatomical structures by assigning each voxel in the volumetric image an identifier by structure and assigning each vertex or face of the mesh from the surface scan image an identifier by structure. In one embodiment, only the distinct anatomical structures that are in common between the volumetric and the surface scan image are segmented and processed for downstream mesh alignment. In yet other embodiments, all assigned voxels that designate for a distinct structure are segmented for downstream processing, regardless of commonalities with the segmented surface scan image. In one embodiment, the surface scan assignment is determined by a margin defining the boundary between each crown and gingiva.

Once segmented, a polygonal mesh from the volumetric image featuring common structures with the polygonal mesh from the surface scan image is extracted/generated by the mesh layer 1205. The meshes from both the volumetric image and from the surface scan image are then converted to point clouds; and the converted meshes are then aligned via point clouds using a point set registration by the alignment module 1206. In one embodiment, the surface scan image mesh is extracted or generated from the surface scan image, while in other embodiments, the surface scan mesh is received de novo or directly from the input source for downstream processing. In yet other embodiments, as shown in FIG. 12B, a conversion module 1205*a* may optionally convert the mesh to a point cloud for downstream alignment by the alignment layer 1206.

Figure 13:
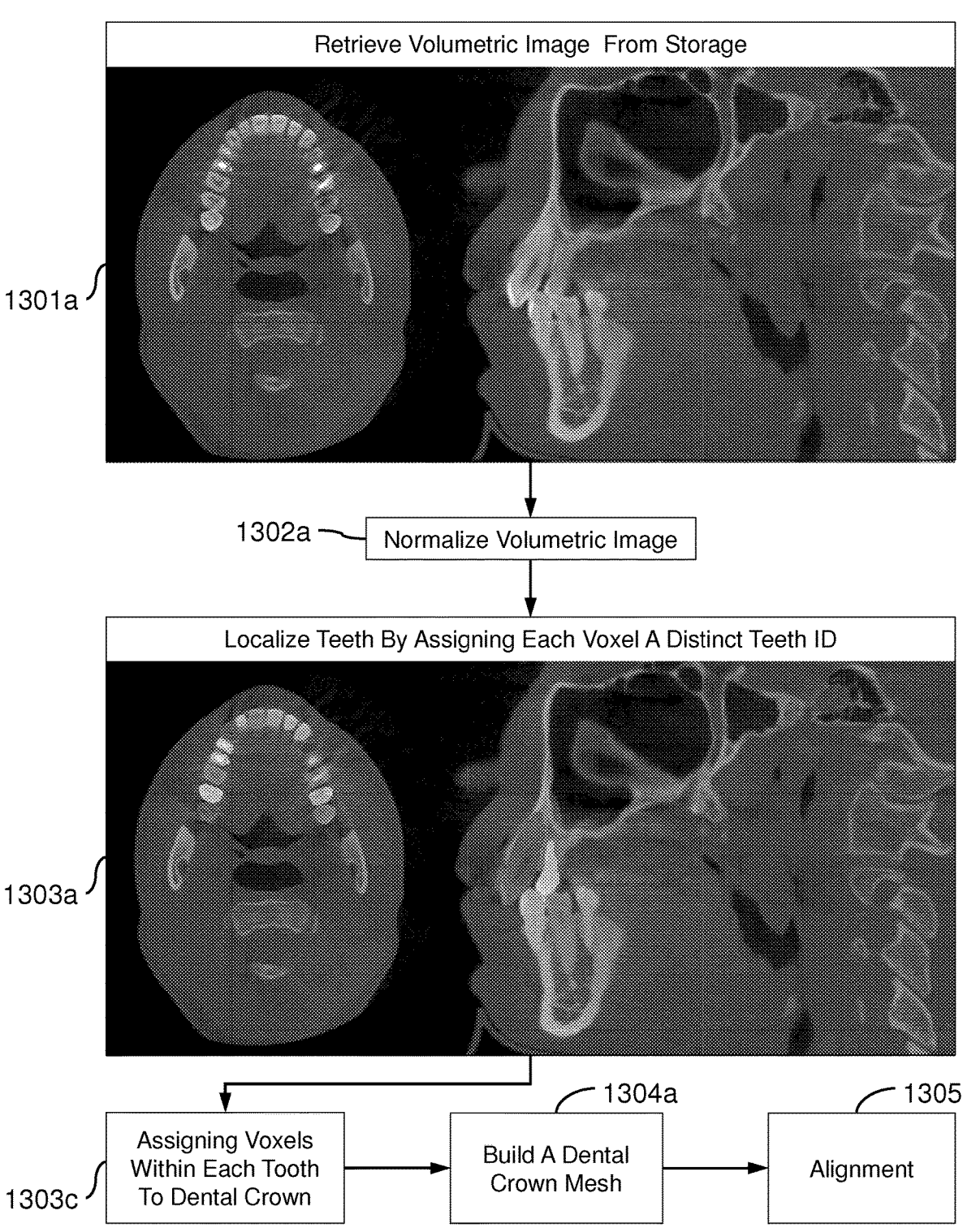
FIG. 13 illustrates in a graphical process flow diagram, the automated alignment pipeline in accordance with an aspect of the invention.

Now in reference to FIG. 13, which illustrates a graphical flow of the alignment pipeline, the alignment method entails the steps of: A method for alignment of volumetric and surface scan images, said method comprising the steps of: receiving a volumetric image and surface scan image, wherein the volumetric image is a three-dimensional voxel array of a maxillofacial anatomy of a patient and the surface scan image is a polygonal mesh corresponding to the maxillofacial anatomy of the same patient 1301*a*, 1301*b*. Optionally, the received images may be additionally preprocessed and normalized to fit for downstream alignment 1302*a*, 1302*b*. The next step entails segmenting the volumetric image and surface scan image into a set of distinct anatomical structures by assigning each voxel in the volumetric image an identifier by structure and assigning each vertex or face of the mesh from the surface scan image an identifier by structure, wherein at least one of the distinct anatomical structures are in common between the volumetric and the surface scan image 1303*a*, 1303*b*. The volumetric image may be further segmented by assigning a subset of voxels to the dental crown 1303*c*; a polygonal mesh featuring common structures with the polygonal mesh from the surface scan image is then extracted from the volumetric image 1304*a*. A teeth mesh is extracted from the surface scan image 1304*b*. Both the meshes, from the volumetric image and from the surface scan image, are converted to point clouds and the converted meshes are aligned via point clouds using a point set Registration 1305.

In a preferred embodiment, the mesh extraction is performed by a Marching Cubes algorithm. Alternatively, the extraction of the polygonal mesh is of a polygonal mesh of an isosurface from a three-dimensional discrete scalar field. Other, less conventional extraction techniques may be used as well. Preferred alignment methods, such as Iterative Closest Point or Deformable Mesh Alignment may be performed. Essentially any means for aligning two partially overlapping meshes given initial guess for relative transform, so long as one mesh is derived from a CBCT (volumetric image), and the other from an IOS (surface scan image). Aligned CBCT and IOS is then used for orthodontic treatment and implant planning. CBCT provides knowledge about internal structures: bone, nerves, sinuses and tooth roots, while IOS provides very precise visible structures: gingiva and tooth crowns. Both scans are needed for high-quality digital dentistry.

The implementation essentially consists of the following steps:

1. Receive a CBCT (in DICOM format) and an IOS (in STL format) from the user.

2. Perform a CBCT image preprocessing: normalize a CBCT image intensity values by clipping the values lying outside the [−1000, 2000] interval and then subtract a mean intensity value and divide by a standard deviation.

3. Using a convolutional neural network, perform teeth segmentation on CBCT, assigning each voxel a distinct tooth ID or a background ID.

4. Segment the dental crowns of localized teeth by the following procedure. For each localized tooth assign a voxel to this tooth's dental crown if:
    a. this voxel was assigned to this tooth during localization 1303*c* AND
    b. the distance between this voxel and the tooth's highest (lowest) point is not greater than 6 mm for the lower (upper) jaw tooth 1303*c*.

5. Build a dental crown mesh using marching cubes algorithm 1304.

6. Perform an Intraoral scan preprocessing: center and rescale the mesh to fit a unit sphere;

7. Using a convolutional neural network, perform teeth segmentation on IOS, assigning each voxel to one of the teeth or a background.

8. Based on teeth segmentation, extract teeth mesh from IOS.

9. Perform an alignment of meshes from p.4 and p.6 using point-set registration algorithms (e.g. Iterative Closest Point).

Figure 14:
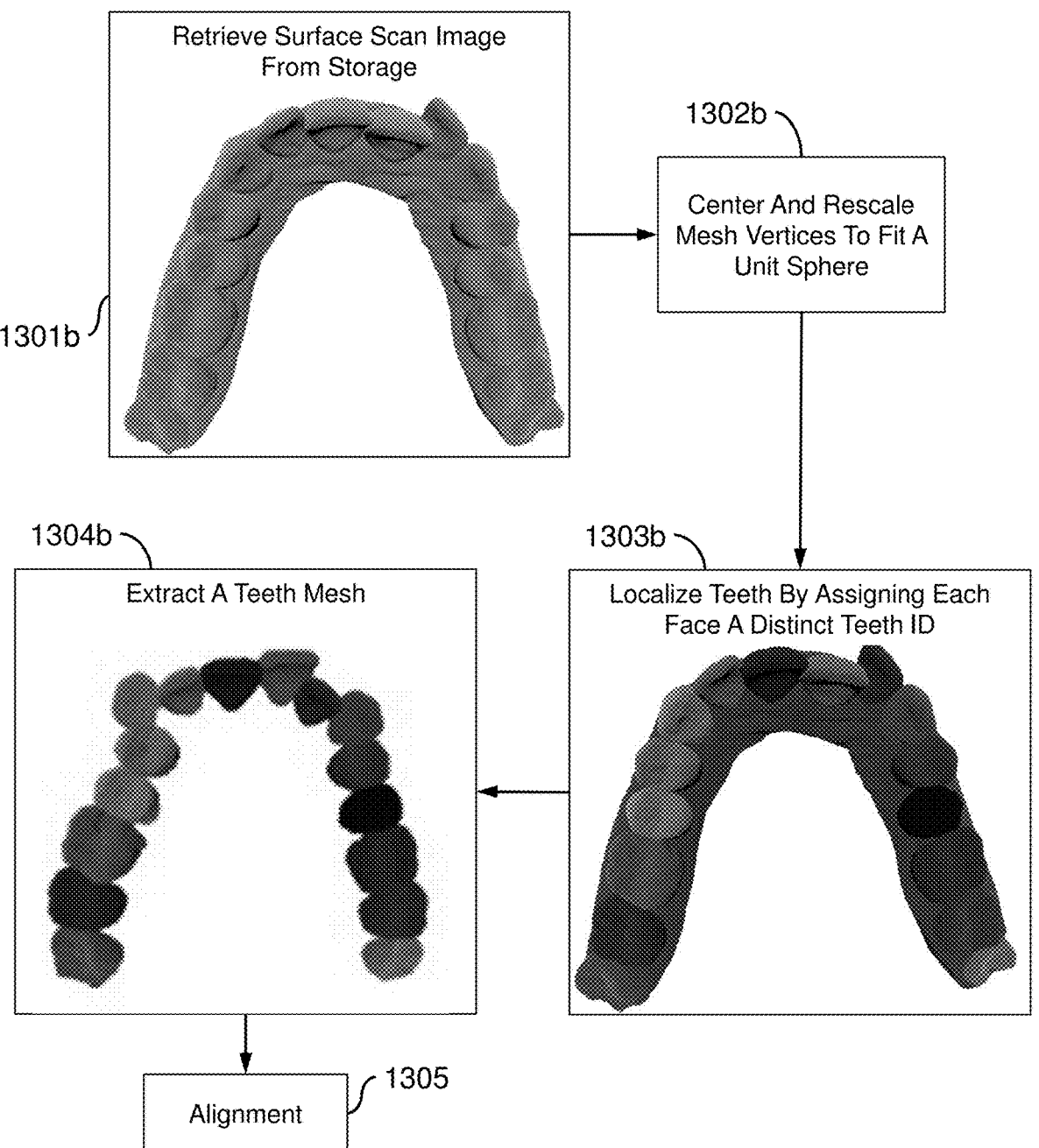
FIG. 14 illustrates in a method flow diagram, the automated alignment pipeline in accordance with an aspect of the invention.
Figure 15:
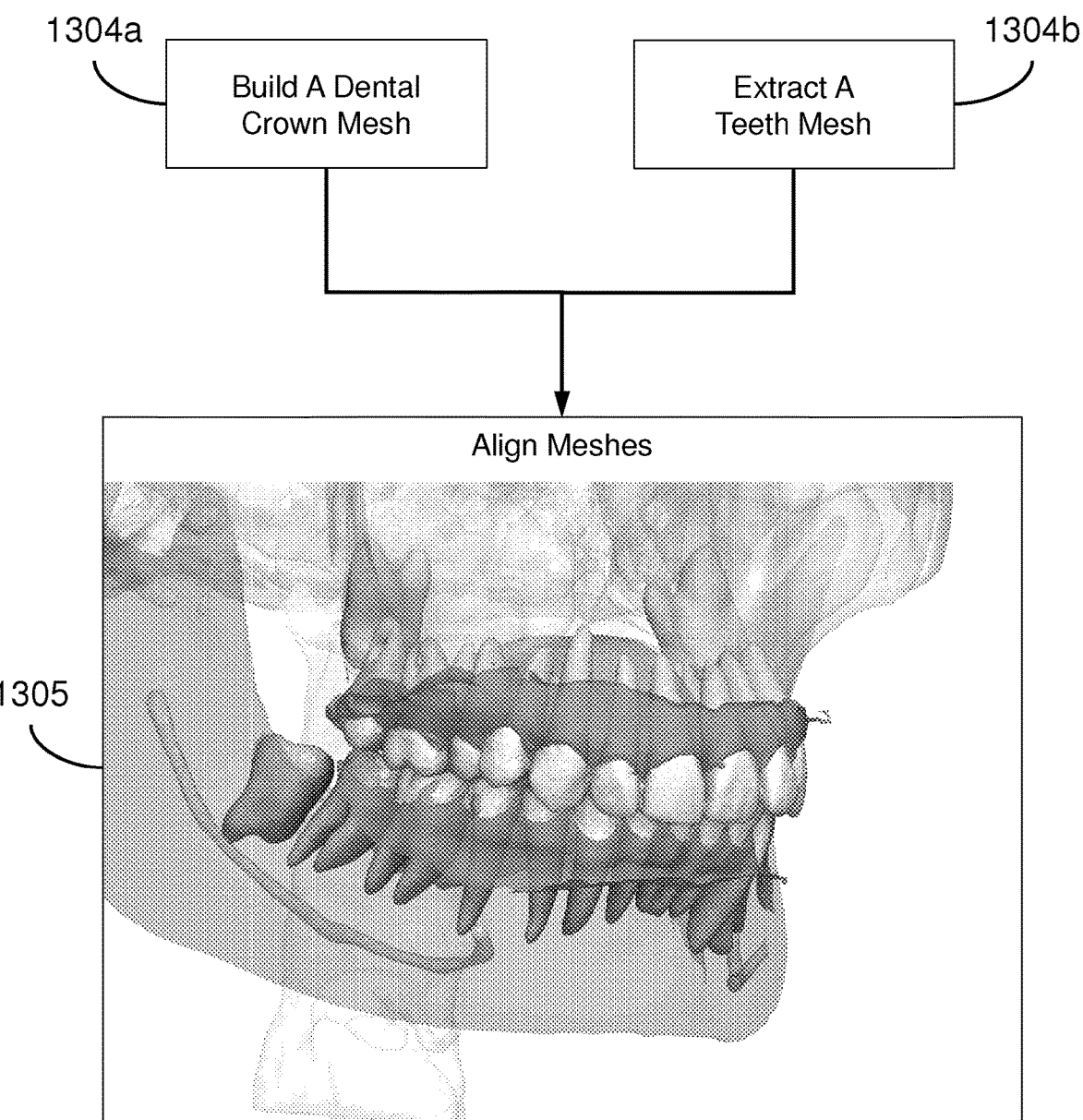
FIG. 15 illustrates in a method flow diagram, the automated alignment pipeline in accordance with an aspect of the invention.

FIGS. 14 and 15 each illustrate a method flow diagram in accordance with an aspect of the invention. As shown in FIG. 14, the method for alignment of CBCT (DICOM format) and IOS (STL format) images, comprises the steps of: A method for alignment of volumetric and surface scan images, said method comprising the steps of: receiving a volumetric image and surface scan image, wherein the volumetric image is a three-dimensional voxel array of a maxillofacial anatomy of a patient and the surface scan image is a polygonal mesh corresponding to the maxillofacial anatomy of the same patient 1402; segmenting the volumetric image and surface scan image into a set of distinct anatomical structures by assigning each voxel in the volumetric image an identifier by structure and assigning each vertex or face of the mesh from the surface scan image an identifier by structure, wherein at least one of the distinct anatomical structures are in common between the volumetric and the surface scan image 1404; extracting a polygonal mesh from the volumetric image featuring common structures with the polygonal mesh from the surface scan image 1406; converting both meshes from the volumetric image and from the surface scan to a point cloud 1408; and aligning the converted meshes via point clouds using a point set registration 1408.

As shown in FIG. 15, the method may obviate the need to build/generate/extract a mesh from the CBCT or volumetric image for purposes of alignment with the IOS mesh. The method entails the steps of: receiving a volumetric image and surface scan image, wherein the volumetric image is a three-dimensional voxel array of a maxillofacial anatomy of a patient and the surface scan image is a polygonal mesh corresponding to the maxillofacial anatomy of the same patient 1502; segmenting the volumetric image and surface scan image into a set of distinct anatomical structures by assigning each voxel in the volumetric image an identifier by structure and assigning each vertex or face of the mesh from the surface scan image an identifier by structure, wherein at least one of the distinct anatomical structures are in common between the volumetric and the surface scan image 1502; applying a binary erosion on the voxels corresponding to a structure (eroded mask) 1504; subtracting the eroded mask from a non-eroded mask revealing voxels on the boundary for selection 1504; selecting a subset of boundary voxels as a point set by selecting a random subset of points to keep a number of points similar to a number of points on a corresponding structure in a polygonal mesh 1506; and aligning a point set from the selected subset of boundary voxels from the received/segmented volumetric image and surface scan image using a point set registration 1508. In another embodiment, the selection of points on the surface of anatomical structures of the volumetric image is done by convolving a binary segmentation image with an edge-detection convolution kernel.

Figure 16:
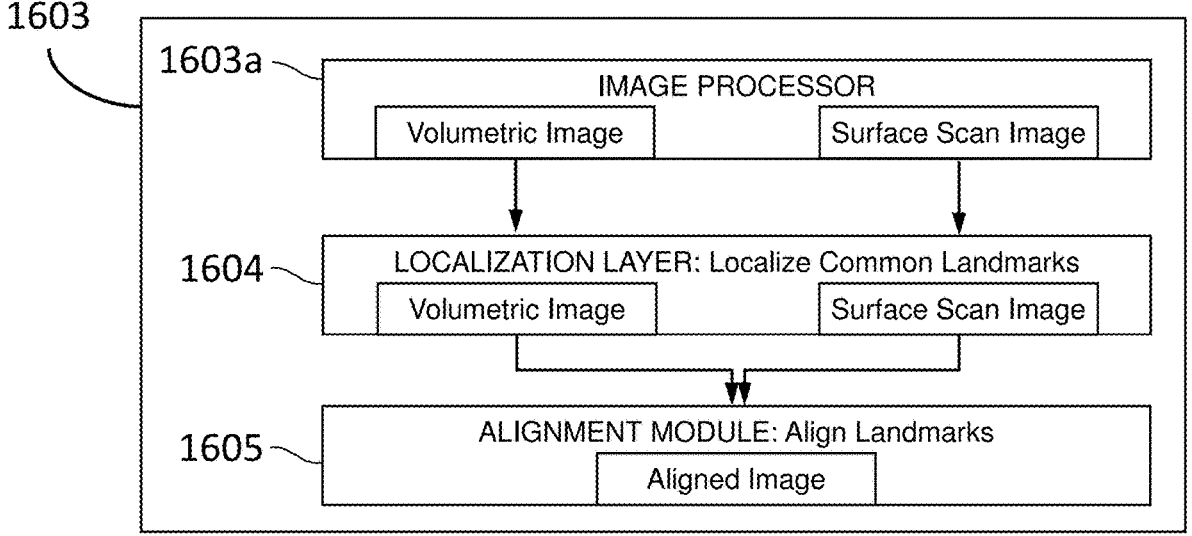
FIG. 16 illustrates in a process flow diagram, the automated alignment pipeline according to an aspect of the invention.

FIG. 16 illustrates a process flow diagram of an embodiment of the invention providing an alternative method of aligning the volumetric and surface scan images. As described previously, the received volumetric image is a three-dimensional voxel array of the maxillofacial anatomy of a patient and the surface scan image received is a polygonal mesh corresponding to the maxillofacial anatomy of the same patient. The image processor is configured to receive the image data from the image source 1603. Optionally, the image data is pre-processed and normalized to fit for downstream alignment. The next step is the localization of dental anatomical landmarks common to both images present inside the volumetric image and on the surface scan image 1604. Standard dental landmarks include:

Exemplary Dental Anatomical Landmarks:

Fauces—Passageway from oral cavity to pharynx.

Frenum—Raised folds of tissue that extend from the alveolar and the buccal and labial mucosa.

Gingiva—Mucosal tissue surrounding portions of the maxillary and mandibular teeth and bone.

Hard palate—Anterior portion of the palate which is formed by the processes of the maxilla.

Incisive papilla—A tissue projection that covers the incisive foramen on the anterior of the hard palate, just behind the maxillary central incisors.

Maxillary tuberosity—A bulge of bone posterior to the most posterior maxillary molar.

Maxillary/Mandibular tori—Normal bony enlargements that can occur either on the maxilla or mandible.

Mucosa—Mucous membrane lines the oral cavity. It can be highly keratinized (such as what covers the hard palate), or lightly keratinized (such as what covers the floor of the mouth and the alveolar processes) or thinly keratinized (such as what covers the cheeks and inner surfaces of the lips).

Palatine rugae—Firm ridges of tissues on the hard palate.

Parotid papilla—Slight fold of tissue that covers the opening to the parotid gland on the buccal mucosa adjacent to maxillary first molars.

Pillars of Fauces—Two arches of muscle tissue that defines the fauces.

Soft palate—Posterior portion of the palate. This is non-bony and is comprised of soft tissue.

Sublingual folds—Small folds of tissue in the floor of the mouth that cover the openings to the smaller ducts of the sublingual salivary gland.

Submandibular gland—Located near the inferior border of the mandible in the submandibular fossa.

Tonsils—Lymphoid tissue located in the oral pharynx.

Uvula—A non-bony, muscular projection that hangs from the midline at the posterior of the soft palate.

Vestibule—Space between the maxillary or mandibular teeth, gingiva, cheeks and lips.

Wharton's duct—Salivary duct opening on either side of the lingual frenum on the ventral surface of the tongue.

Following the localization of landmarks common to both the volumetric and surface scan images, the images are aligned by minimizing the distance between the corresponding landmarks present in both images 1605. Alignment may be performed alternatively between: a polygonal mesh of a volumetric image and a polygonal mesh of a surface scan image; a point set of a volumetric image and a point set of a surface scan image; a mesh of a volumetric image and a point set of a surface scan image; or a point set of a volumetric image and a mesh of a surface scan image.

Alternatively, volumetric images and surface scan images may be combined into a single image via a fusion of tooth meshes. FIG. 17 illustrates a method flow diagram of an aspect of this invention. The method entails receiving both a volumetric image mesh and a surface scan image mesh from the same patient in the same format and registered to a related coordinate system 1702. A related coordinate system implies an identical coordinate or one that is similar enough to infer a location of a point on the mesh/converted mesh. Next, the parts of the volumetric tooth crown mesh also present on the surface crown mesh are identified and segmented 1704. In one embodiment, this is accomplished by first segmenting and enumerating the teeth on the surface scan using a convolutional neural network. Alternatively, the method entails receiving both a volumetric image mesh and a surface scan image mesh which are already segmented. Received segmented meshes are from the same patient in the same format and registered to a related coordinate system. Each tooth on a surface scan image mesh is then isolated into a separate mesh. In one embodiment, this is accomplished by the following procedure: for each pair of neighboring teeth, border vertices are identified by finding common vertices of two sub-meshes corresponding to the two teeth; a plane is fit on the border vertices using the singular value decomposition (SVD) to obtain a plane, referred to as a separating plane; for each tooth, the separating plain is moved toward the tooth center by a constant offset of 0.5 mm; the vertices where a separating plain and a tooth mesh interest are found; the tooth mesh is sliced with the separating plane; and the resulting hole in the tooth mesh is filled by triangulating the points of intersection. The teeth of the volumetric mesh are then segmented and enumerated using a convolutional neural network.

Once both are segmented and enumerated, the volumetric tooth mesh and the surface scan tooth mesh are matched by their numbers. For each numbered tooth, the faces of the volumetric tooth mesh also present in the surface scan tooth crown mesh are identified. In one embodiment, this is accomplished by, for each face of the surface scan mesh, identifying the nearest face of the volumetric tooth mesh. Next, each face in the volumetric tooth mesh found to match a face in the surface scan tooth crown mesh is removed from the volumetric tooth mesh 1708. Then fusion vertices on the volumetric and surface scan meshes are identified. The fusion vertices determine the areas on both meshes where the two meshes should be fused. In one embodiment, this is accomplished by finding edges (pairs of vertices) adjacent to a single triangle on both volumetric and surface scan meshes. The two meshes are then fused by triangulating the Fusion vertices 1710. In one embodiment, the triangulation is performed in the following way: combine fusion vertices from both meshes into a single point cloud; then triangulate it by generating an alpha shape with a manually set alpha-parameter of 0.8. This results in a fusion of two meshes by smoothly joining the fusion vertices.

Figure 18:
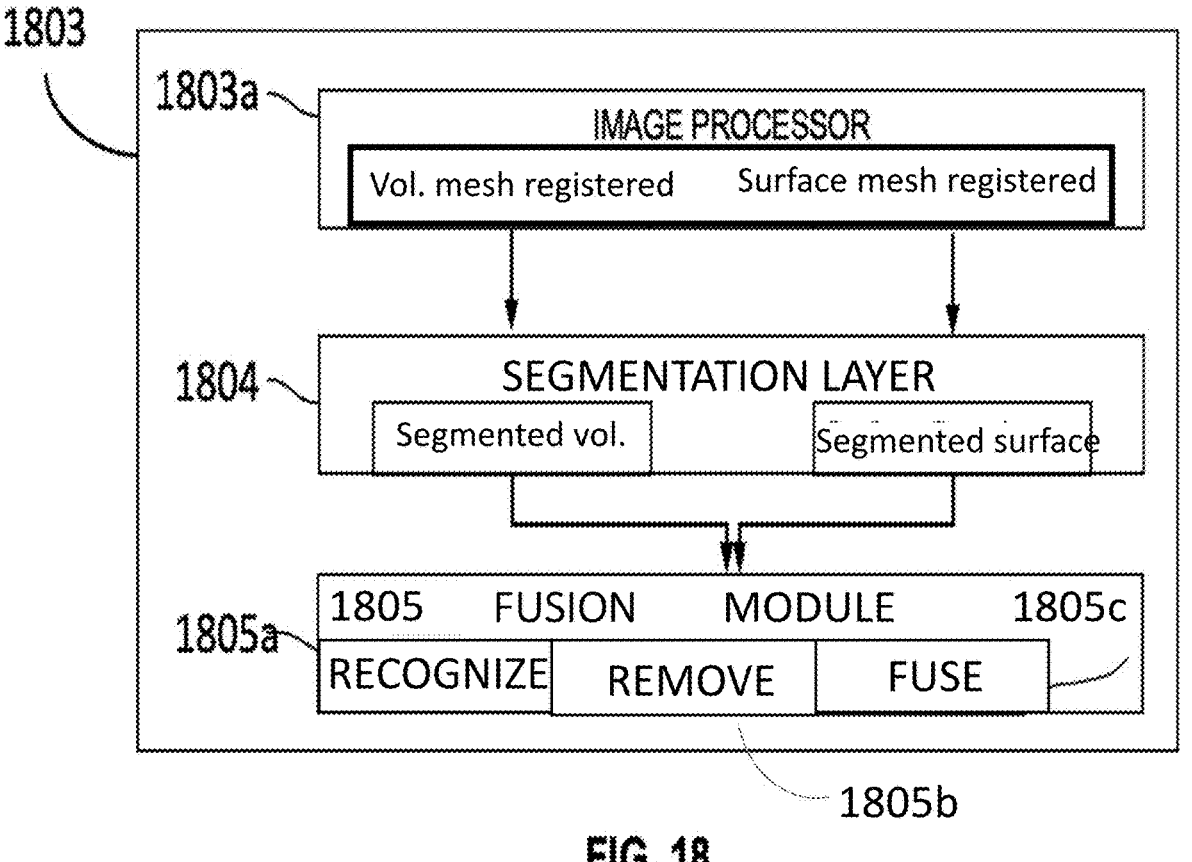
FIG. 18 illustrates in a system block diagram, the automated fusion pipeline according to an aspect of the invention.
Figure 19:
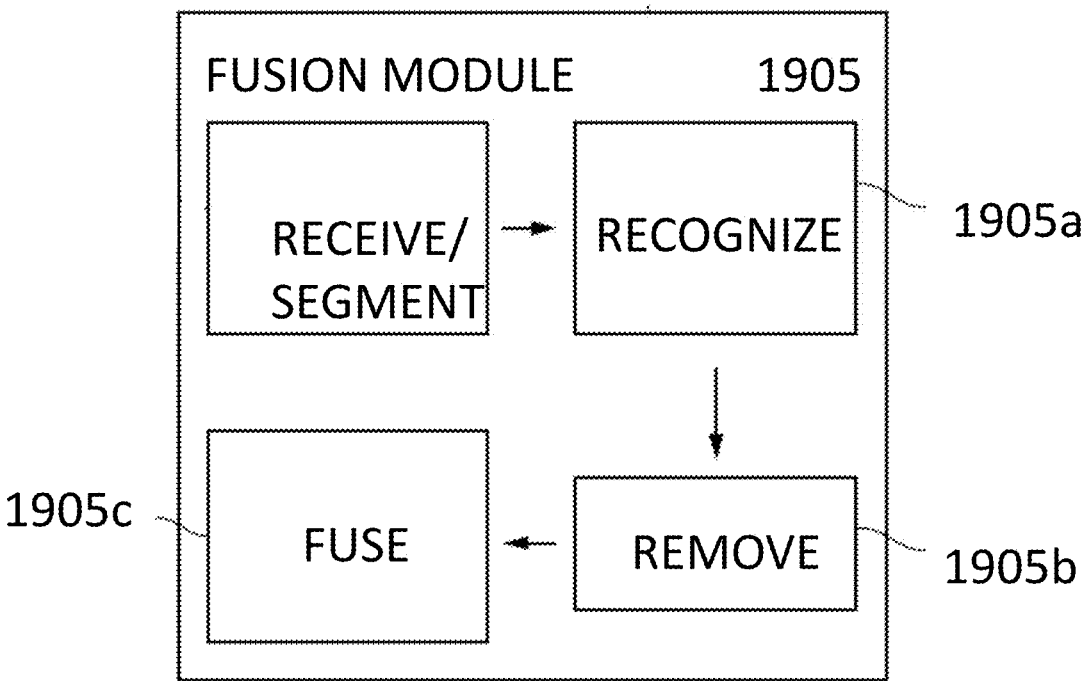
FIG. 19 illustrates in a system block diagram, the automated fusion pipeline according to an aspect of the invention.

Now in reference to FIGS. 18 and 19, which each illustrate in block diagram form, an exemplary system for the automated and AI-aided fusion of volumetric images and surface scan images for improved dental diagnostics. FIG. 18 illustrates a block diagram of the system comprising an input event source; a memory unit in communication with the input event source; a processor 1803 in communication with the memory unit; an image processor 1803*a* in communication with the processor 1803; a segmentation layer 1804 in communication with the fusion module 1805. In an embodiment, the memory unit is a non-transitory storage element storing encoded information. The encoded instructions when implemented by the processor 1803, configure the automated fusion system to fuse a volumetric image with a surface scan image for improved visual details/diagnostics. In one embodiment, the system, enabled by the fusion module, is configured to: receive both a volumetric image tooth mesh and surface scan image tooth crown mesh from a same patient, in the same format, registered to a related coordinate system 1803; segment by anatomical structure each of the registered meshes that are in common between each of the registered volumetric image tooth mesh and the surface scan tooth crown mesh 1804; recognize a border vertices for each of the segmented volumetric image tooth mesh and segmented surface scan tooth crown mesh for matching the recognized meshes 1805*a*; remove a surface fragment from the matched volumetric image mesh in common with the matched surface scan image mesh 1805*b*; and fuse the surface-removed meshes by triangulating the recognized border vertices 1805*c*.

As illustrated in FIG. 19, the fusion module 1905 may be further comprised of a recognition block 1905*a*; a removal block 1905*b*; and a fusion block 1905*c*, each performing an aspect of the fusion pipeline. In another embodiment, a single fusion module or block may collectively perform the steps of recognizing a border vertices for each of the segmented volumetric image tooth mesh and segmented surface scan tooth crown mesh for matching the recognized meshes 1905*a*; removing a surface fragment from the matched volumetric image mesh in common with the matched surface scan image mesh 1905*b*; and fusing the surface-removed meshes by triangulating the recognized border vertices 1905*c*.

Advantageously, the present invention provides an end-to-end pipeline for detecting state or condition of the teeth in dental 3D CBCT scans. The condition of the teeth is detected by localizing each present tooth inside an image volume and predicting condition of the tooth from the volumetric image of a tooth and its surroundings. Further, the performance of the localization model allows to build a high-quality 2D panoramic reconstruction, which provides a familiar and convenient way for a dentist to inspect a 3D CBCT image. The performance of the pipeline is improved by adding volumetric data augmentations during training; reformulating the localization task as instance segmentation instead of semantic segmentation; reformulating the localization task as object detection, and use of different class imbalance handling approaches for the classification model. Alternatively, the jaw region of interest is localized and extracted as a first step in the pipeline. The jaw region typically takes around 30% of the image volume and has adequate visual distinction. Extracting it with a shallow/small model would allow for larger downstream models. Further, the diagnostic coverage of the present invention extends from basic tooth conditions to other diagnostically relevant conditions and pathologies.

The figures illustrate the architecture, functionality, and operation of possible implementations of systems, methods and computer program products according to various embodiments of the present invention. It should also be noted that, in some alternative implementations, the functions noted/illustrated may occur out of the order noted. For example, two blocks shown in succession may, in fact, be executed substantially concurrently, or the blocks may sometimes be executed in the reverse order, depending upon the functionality involved.

Since various possible embodiments might be made of the above invention, and since various changes might be made in the embodiments above set forth, it is to be understood that all matter herein described or shown in the accompanying drawings is to be interpreted as illustrative and not to be considered in a limiting sense. Thus, it will be understood by those skilled in the art of creating independent multi-layered virtual workspace applications designed for use with independent multiple input systems that although the preferred and alternate embodiments have been shown and described in accordance with the Patent Statutes, the invention is not limited thereto or thereby.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Some portions of embodiments disclosed are implemented as a program product for use with an embedded processor. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive, solid-state disk drive, etc.); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The present invention and some of its advantages have been described in detail for some embodiments. It should be understood that although the system and process is described with reference to automated segmentation pipeline systems and methods, the system and process may be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, and composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

We claim:

1. A method for fusion of volumetric and surface scan images, said method comprising the steps of:

receiving both a volumetric image tooth mesh and surface scan image tooth crown mesh from a same patient, in the same format, registered to a related coordinate system;

segmenting by anatomical structure each of the registered meshes that are in common between each of the registered volumetric image tooth mesh and the surface scan tooth crown mesh; and recognizing fusion vertices for each of the segmented volumetric image tooth mesh and segmented surface scan tooth crown mesh;

fusing the surface scan and volumetric image meshes based on the recognized fusion vertices, resulting in a tooth mesh with a crown from the surface scan and a root from the volumetric image.

2. The method of claim 1, wherein the received mesh from each of the volumetric image and surface scan image is received segmented.

3. The method of claim 1, wherein segmentation comprises identifying common vertices within each of a sub-mesh corresponding to a neighboring pair of teeth.

4. The method of claim 3, wherein the vertices result in a separating plane moving toward a tooth center, resulting in a slice of each the sub-mesh.

5. The method of claim 4, wherein the move toward the center of the tooth center is by a pre-defined off-set.

6. The method of claim 4, wherein the slice results in a void between each of the sub-meshes upon removal of the slice.

7. The method of claim 6, wherein the resulting void is filled by triangulating points of intersection.

8. The method of claim 6, wherein the sub-meshes from each of the recognized volumetric image tooth mesh and the recognized surface scan tooth crown mesh are matched based on the enumeration.

9. The method of claim 1, further comprising identifying a surface fragment of a face from a matched volumetric image sub-mesh in common with the matched surface scan sub-mesh for removal.

10. The method of claim 1, wherein the fusing by triangulation is by identifying fusion vertices of the matched sub-meshes by identifying edges adjacent to a single triangle.

11. The method of claim 10, wherein the triangulation is by achieved by combining fusion vertices from both sub-meshes into a single point cloud; and generating an alpha shape joining the fusion vertices.

12. A method for fusing a volumetric and surface scan image, said method comprising the steps of:

receiving both a segmented volumetric image tooth mesh and a segmented surface scan image tooth crown mesh from a same patient, in a same format, registered to a related coordinate system;

matching both meshes based on an enumeration from the segmentation;

recognizing fusion vertices from the matched meshes; and fusing the surface scan and volumetric image meshes using the recognized fusion vertices, resulting in a tooth mesh with a crown from surface scan and a root from volumetric image.

* * * * *